(12) United States Patent
Wang et al.

(10) Patent No.: US 11,792,771 B2
(45) Date of Patent: Oct. 17, 2023

(54) TRANSPORT BLOCK FORWARDING OVER DIFFERENT AIR INTERFACES

(71) Applicant: QUALCOMM incorporated, San Diego, CA (US)

(72) Inventors: Hua Wang, Basking Ridge, NJ (US); Sony Akkarakaran, Poway, CA (US); Hong Cheng, Basking Ridge, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 201 days.

(21) Appl. No.: 17/498,584

(22) Filed: Oct. 11, 2021

(65) Prior Publication Data

US 2022/0132470 A1    Apr. 28, 2022

Related U.S. Application Data

(60) Provisional application No. 63/105,049, filed on Oct. 23, 2020.

(51) Int. Cl.
*H04W 72/04* (2023.01)
*H04W 72/02* (2009.01)
(Continued)

(52) U.S. Cl.
CPC ........... *H04W 72/02* (2013.01); *H04L 1/1819* (2013.01); *H04W 72/044* (2013.01);
(Continued)

(58) Field of Classification Search
CPC ... H04W 72/02; H04W 72/044; H04W 72/20; H04W 92/10; H04W 92/18; H04W 76/15;
(Continued)

(56) References Cited

U.S. PATENT DOCUMENTS

2014/0029471 A1* 1/2014 Tavildar ............... H04W 48/16
370/255
2014/0328329 A1* 11/2014 Novlan ............ H04W 56/0015
370/336
(Continued)

OTHER PUBLICATIONS

3GPP TR 23.752: "3rd Generation Partnership Project; Technical Specification Group Services and System Aspects; Study on System Enhancement for Proximity Based Services (ProSe) in the 5G System (5GS) (Release17)", 3GPP Standard; Technical Report, 3GPP TR23.752, 3rd Generation Partnership Project (3GPP), Mobile Competence Centre, 650, Route Des Lucioles, F-06921 Sophia-Antipolis Cedex, France, No. V0.5.0, Sep. 29, 2020 (Sep. 29, 2020), pp. 1-162, XP051961188, Retrieved from the Internet: URL:ftp://ftp.3gpp.org/Specs/archive/23_series/23.752/23752-050.zip [retrieved on Sep. 29, 2020], paragraph [6.7.2.6] paragraph [6.24.1] paragraph [A.2.1].

(Continued)

*Primary Examiner* — Mahbubul Bar Chowdhury
(74) *Attorney, Agent, or Firm* — Holland & Hart / Qualcomm

(57) ABSTRACT

Methods, systems, and devices for wireless communications are described. A relay node may receive, from a source node, control signaling configuring the relay node to receive a transport block via a first air interface and to forward the transport block to a target node via a second air interface that is different than the first air interface. In some cases, each of the first air interface and the second air interface may support a same size transport block. The relay node may receive, from the source node via the first air interface, a first message including the transport block in a format of the first air interface based on the control signaling. The relay node may transmit, via the second air interface to the target node, a second message including the transport block and an (Continued)

indication that the transport block is in the format of the first air interface.

30 Claims, 16 Drawing Sheets

(51) Int. Cl.
*H04L 1/1812* (2023.01)
*H04W 72/044* (2023.01)
*H04W 72/20* (2023.01)
*H04W 92/18* (2009.01)
*H04W 92/10* (2009.01)

(52) U.S. Cl.
CPC ............ *H04W 72/20* (2023.01); *H04W 92/10* (2013.01); *H04W 92/18* (2013.01)

(58) Field of Classification Search
CPC .... H04W 76/14; H04W 88/04; H04L 1/1819; H04L 1/0041; H04L 1/0045; H04L 1/0075; H04L 2001/0097
See application file for complete search history.

(56) References Cited

U.S. PATENT DOCUMENTS

| | | | |
|---|---|---|---|
| 2017/0093541 A1* | 3/2017 | Pan | H04W 72/23 |
| 2018/0091964 A1* | 3/2018 | Adachi | H04W 8/00 |
| 2019/0098697 A1* | 3/2019 | Fujishiro | H04W 40/12 |
| 2019/0387446 A1* | 12/2019 | Xu | H04W 40/248 |
| 2021/0153063 A1* | 5/2021 | Zhang | H04W 76/14 |
| 2022/0039145 A1* | 2/2022 | Sun | H04W 72/23 |

OTHER PUBLICATIONS

Apple, et al., "R17 Sidelink Relay", 3GPP Draft, RP-192717, 3GPP TSG RAN Meeting #86, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019-Dec. 12, 2019, Dec. 2, 2019 (Dec. 2, 2019), XP051834325, pp. 1-5, Retrieved from the Internet: URL:https://ftp.3gpp.org/tsg_ran/TSG_RAN/TSGR_86/Docs/RP-192717.zip [retrieved on Dec. 2, 2019] the Whole Document.
International Search Report and Written Opinion—PCT/US2021/071816—ISA/EPO—dated Jan. 25, 2022.
OPPO: "Study on NR Sidelink Relay", 3GPP Draft, RP-201473, 3GPP TSG RAN meeting #89e, 3rd Generation Partnership Project (3GPP), Mobile Competence Centre, 650, Route Des Lucioles, F-06921 Sophia-Antipolis Cedex, France, vol. TSG RAN, No. Electronic Meeting, Sep. 14, 2020-Sep. 18, 2020, Sep. 7, 2020 (Sep. 7, 2020), XP051931206, pp. 1-9, Retrieved from the Internet: URL:https://ftp.3gpp.org/tsg_ran/TSG_RAN/TSGR_89e/Docs/RP-201473.zip [retrieved on Sep. 7, 2020] the Whole Document.

* cited by examiner

TRANSPORT BLOCK FORWARDING OVER DIFFERENT AIR INTERFACES

CROSS REFERENCE

The present Application for Patent claims the benefit of U.S. Provisional Patent Application No. 63/105,049 by WANG et al., entitled "TRANSPORT BLOCK FORWARDING OVER DIFFERENT AIR INTERFACES," filed Oct. 23, 2020, assigned to the assignee hereof, and expressly incorporated by reference herein.

FIELD OF TECHNOLOGY

The following relates to wireless communications, including transport block forwarding over different air interfaces.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A device may operate as a relay node between a source node and a target node. The relay node may receive information from the source node and forward the information to the target node. Some techniques for relay configurations can be improved.

SUMMARY

The described techniques relate to improved methods, systems, devices, and apparatuses that support transport block forwarding over different air interfaces. Some wireless communications systems may support relay communications. For example, a source node may send a message to a relay node, and the relay node may forward the message to a destination node or target node. The relay node may have a first air interface established with the source node and a second, different air interface established with the target node. In some examples, the first air interface and the second air interface may each support transmission of transport blocks of a same size. A relay node may be configured to forward, or relay, a transport block over different air interfaces. A relay node may receive a transport block over a first air interface to send to the target node over a second air interface. The relay node may indicate to the target node that the transport block is formatted in accordance with, or following a protocol of, the first air interface. In some cases, the source node may send control signaling to the relay node, configuring the relay node to forward the transport block to the target node. For example, the relay node may send a message to the target node including the transport block and an indication that the transport block is formatted according to the first air interface. The target node may receive the message and may decode the transport block based on the indication. For example, the relay node may perform physical layer decoding and demodulation using according to a first format of the first air interface then decode the transport block according to a second format of the second air interface to obtain the information from the source node.

A method for wireless communications at a relay node is described. The method may include receiving, from a source node, control signaling configuring the relay node to receive a transport block via a first air interface and to forward the transport block to a target node via a second air interface that is different than the first air interface, each of the first air interface and the second air interface supporting a same size transport block, receiving, from the source node via the first air interface, a first message including the transport block in a format of the first air interface based on the control signaling, and transmitting, via the second air interface to the target node, a second message including the transport block and an indication that the transport block is in the format of the first air interface.

An apparatus for wireless communications at a relay node is described. The apparatus may include a processor, memory in electronic communication with the processor, and instructions stored in the memory. The instructions may be executable by the processor to cause the apparatus to receive, from a source node, control signaling configuring the relay node to receive a transport block via a first air interface and to forward the transport block to a target node via a second air interface that is different than the first air interface, each of the first air interface and the second air interface supporting a same size transport block, receive, from the source node via the first air interface, a first message including the transport block in a format of the first air interface based on the control signaling, and transmit, via the second air interface to the target node, a second message including the transport block and an indication that the transport block is in the format of the first air interface.

Another apparatus for wireless communications at a relay node is described. The apparatus may include means for receiving, from a source node, control signaling configuring the relay node to receive a transport block via a first air interface and to forward the transport block to a target node via a second air interface that is different than the first air interface, each of the first air interface and the second air interface supporting a same size transport block, means for receiving, from the source node via the first air interface, a first message including the transport block in a format of the first air interface based on the control signaling, and means for transmitting, via the second air interface to the target node, a second message including the transport block and an indication that the transport block is in the format of the first air interface.

A non-transitory computer-readable medium storing code for wireless communications at a relay node is described. The code may include instructions executable by a processor to receive, from a source node, control signaling configuring the relay node to receive a transport block via a first air interface and to forward the transport block to a target node via a second air interface that is different than the first air interface, each of the first air interface and the second air interface supporting a same size transport block, receive, from the source node via the first air interface, a first message including the transport block in a format of the first air interface based on the control signaling, and transmit, via the second air interface to the target node, a second message including the transport block and an indication that the transport block is in the format of the first air interface.

In some examples of the method, apparatuses, and non-transitory computer-readable medium described herein, transmitting the second message may include operations, features, means, or instructions for transmitting the second message including sidelink control information that includes the indication that the transport block may be in the format of the first air interface.

In some examples of the method, apparatuses, and non-transitory computer-readable medium described herein, transmitting the second message may include operations, features, means, or instructions for transmitting the second message including the indication that a medium access control packet included in the second message may be in the format of the first air interface.

In some examples of the method, apparatuses, and non-transitory computer-readable medium described herein, receiving the first message may include operations, features, means, or instructions for decoding the first message according to the format of the first air interface to obtain a packet data unit including the transport block, and encoding the packet data unit to generate the second message based on a second format of the second air interface.

Some examples of the method, apparatuses, and non-transitory computer-readable medium described herein may further include operations, features, means, or instructions for forwarding the packet data unit from a first medium access control layer of a first protocol stack of the first air interface to a second medium access control layer of a second protocol stack of the second air interface for encoding to generate the second message.

In some examples of the method, apparatuses, and non-transitory computer-readable medium described herein, the first air interface may be a radio air interface between the relay node and a radio access network of the source node, and the second air interface may be a sidelink air interface.

In some examples of the method, apparatuses, and non-transitory computer-readable medium described herein, the relay node may be a first UE, the target node may be a second UE, and the source node may be a base station.

A method for wireless communications at a target node is described. The method may include receiving, from a relay node via a second air interface, a message including a transport block and an indication that the transport block is in a format of a first air interface that is different than the second air interface, each of the first air interface and the second air interface supporting a same size transport block and decoding the transport block from the message in accordance with the format of the first air interface based on the indication.

An apparatus for wireless communications at a target node is described. The apparatus may include a processor, memory in electronic communication with the processor, and instructions stored in the memory. The instructions may be executable by the processor to cause the apparatus to receive, from a relay node via a second air interface, a message including a transport block and an indication that the transport block is in a format of a first air interface that is different than the second air interface, each of the first air interface and the second air interface supporting a same size transport block and decode the transport block from the message in accordance with the format of the first air interface based on the indication.

Another apparatus for wireless communications at a target node is described. The apparatus may include means for receiving, from a relay node via a second air interface, a message including a transport block and an indication that the transport block is in a format of a first air interface that is different than the second air interface, each of the first air interface and the second air interface supporting a same size transport block and means for decoding the transport block from the message in accordance with the format of the first air interface based on the indication.

A non-transitory computer-readable medium storing code for wireless communications at a target node is described. The code may include instructions executable by a processor to receive, from a relay node via a second air interface, a message including a transport block and an indication that the transport block is in a format of a first air interface that is different than the second air interface, each of the first air interface and the second air interface supporting a same size transport block and decode the transport block from the message in accordance with the format of the first air interface based on the indication.

In some examples of the method, apparatuses, and non-transitory computer-readable medium described herein, receiving the message may include operations, features, means, or instructions for receiving the message including sidelink control information that includes the indication that the transport block may be in the format of the first air interface.

In some examples of the method, apparatuses, and non-transitory computer-readable medium described herein, receiving the message may include operations, features, means, or instructions for receiving the message including the indication that a medium access control packet included in the message may be in the format of the first air interface.

In some examples of the method, apparatuses, and non-transitory computer-readable medium described herein, decoding the transport block may include operations, features, means, or instructions for decoding a physical layer of the message in accordance with a second format for the second air interface to obtain a packet data unit including the transport block, and decoding the packet data unit in accordance with the format of the first air interface.

Some examples of the method, apparatuses, and non-transitory computer-readable medium described herein may further include operations, features, means, or instructions for forwarding the packet data unit from a second medium access control layer of a second protocol stack of the second air interface to a first medium access control layer of a first protocol stack of the first air interface for decoding the packet data unit.

In some examples of the method, apparatuses, and non-transitory computer-readable medium described herein, the packet data unit is forwarded from a first medium access control hybrid automatic repeat request entity of the first medium access control layer to a second medium access control hybrid automatic repeat request entity of the second medium access control layer.

In some examples of the method, apparatuses, and non-transitory computer-readable medium described herein, the first air interface may be a radio air interface between the relay node and a radio access network of a source node, and the second air interface may be a sidelink air interface.

In some examples of the method, apparatuses, and non-transitory computer-readable medium described herein, the relay node may be a first UE, the target node may be a second UE, and a source node may be a base station.

A method for wireless communications at a source node is described. The method may include transmitting, to a relay node, control signaling configuring the relay node to receive a transport block via a first air interface and to forward the transport block to a target node via a second air interface that is different than the first air interface, each of the first air interface and the second air interface supporting a same size transport block and transmitting, to the relay node via the first air interface, a first message including the transport block in a format of the first air interface based on the control signaling.

An apparatus for wireless communications at a source node is described. The apparatus may include a processor, memory in electronic communication with the processor, and instructions stored in the memory. The instructions may be executable by the processor to cause the apparatus to transmit, to a relay node, control signaling configuring the relay node to receive a transport block via a first air interface and to forward the transport block to a target node via a second air interface that is different than the first air interface, each of the first air interface and the second air interface supporting a same size transport block and transmit, to the relay node via the first air interface, a first message including the transport block in a format of the first air interface based on the control signaling.

Another apparatus for wireless communications at a source node is described. The apparatus may include means for transmitting, to a relay node, control signaling configuring the relay node to receive a transport block via a first air interface and to forward the transport block to a target node via a second air interface that is different than the first air interface, each of the first air interface and the second air interface supporting a same size transport block and means for transmitting, to the relay node via the first air interface, a first message including the transport block in a format of the first air interface based on the control signaling.

A non-transitory computer-readable medium storing code for wireless communications at a source node is described. The code may include instructions executable by a processor to transmit, to a relay node, control signaling configuring the relay node to receive a transport block via a first air interface and to forward the transport block to a target node via a second air interface that is different than the first air interface, each of the first air interface and the second air interface supporting a same size transport block and transmit, to the relay node via the first air interface, a first message including the transport block in a format of the first air interface based on the control signaling.

In some examples of the method, apparatuses, and non-transitory computer-readable medium described herein, the first air interface may be a radio air interface between the relay node and a radio access network of the source node, and the second air interface may be a sidelink air interface.

In some examples of the method, apparatuses, and non-transitory computer-readable medium described herein, the relay node may be a first UE, the target node may be a second UE, and the source node may be a base station.

DETAILED DESCRIPTION

Figure 1:
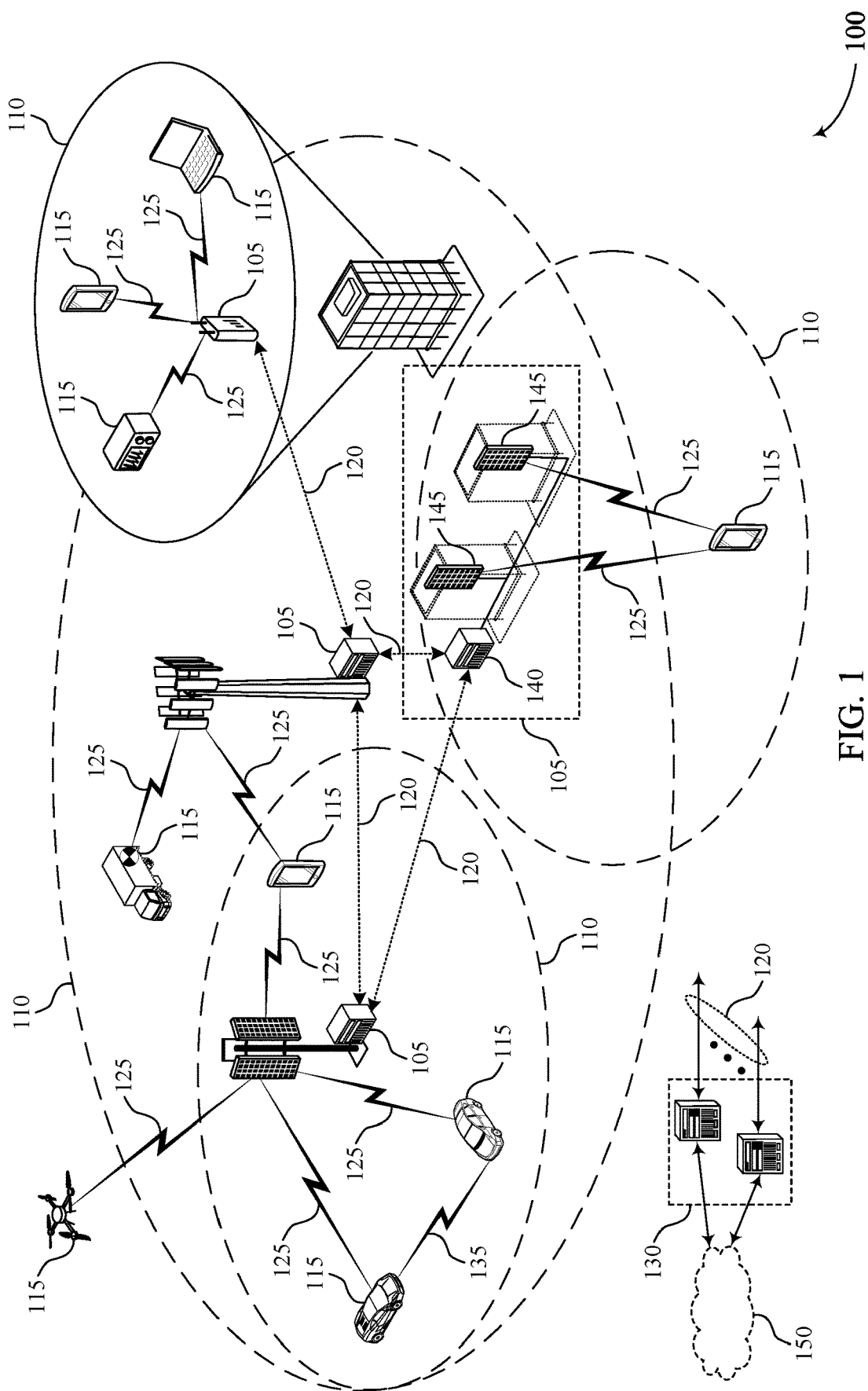
FIG. 1 illustrates an example of a system for wireless communications that supports transport block forwarding over different air interfaces in accordance with aspects of the present disclosure.

Some wireless communications systems may support relay communications. For example, a source node may send a message to a relay node, and the relay node may send the message to a destination node or target node. The relay node may have a first air interface established with the source node and a second air interface established with the target node. In some cases, the first air interface may be an example of a radio air interface between a user equipment (UE) and a radio access network of the source node, and the second air interface may be an example of an air interface between wireless devices, such as a sidelink air interface between UEs. In some examples, the first air interface and the second air interface may each support transmission of transport blocks of a same size. For example, the source device may transmit message with a transport block of a certain size on the first air interface, and the relay node may also transmit a message with a transport block of that size on the second air interface to relay the information to the target node.

If the first air interface and the second air interface are a same type of interface, a relay node may be able to directly forward a transport block on the second air interface to the target node. However, if the first air interface and the second air interface are different types of air interfaces, the target node may be unable to decode the directly forwarded transport block. For example, the target node may receive the transport block over the second air interface associated with the second type of air interface and assume the transport block follows the protocol of the second air interface. However, some formatting of a transport block may be different for the first air interface and the second air interface. Therefore, the target node may be unable to decode the transport block, as the target node may be unaware that the transport block is formatted in accordance with the first air interface.

Techniques described herein support forwarding a transport block across different air interfaces. For example, if a relay node receives a transport block over a first air interface to send to the target node over a second air interface, the relay node may indicate to the target node that the transport block is formatted in accordance with, or following a protocol of, the first air interface. In some cases, the source node may send control signaling to the relay node, configuring the relay node to forward the transport block to the target node. For example, the relay node may send a message to the target node including the transport block and an indication that the transport block is formatted according to the first air interface. The target node may receive the message and may decode the transport block based on the indication. For example, the relay node may perform physical layer decoding and demodulation according to a first format of the first air interface then decode the transport block according to a second format of the second air interface to obtain the information from the source node.

Aspects of the disclosure are initially described in the context of wireless communications systems. Aspects of the disclosure are further illustrated by and described with reference to apparatus diagrams, system diagrams, and flowcharts that relate to transport block forwarding over different air interfaces.

FIG. 1 illustrates an example of a wireless communications system 100 that supports aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets.

The wireless communications system 100 may support relay communications. For example, a source node may send a message to a relay node, and the relay node may send the message to a destination node or target node. The source node, relay node, and target node may be examples of UEs 115, base stations 105, transmission and reception points, or a combination thereof. The relay node may have a first link established with the source node and a second link established with the target node. In some cases, the first link may be an example of a radio air interface between a UE 115 and a radio access network of the source node, such as the second link may be an example of a radio air interface between wireless devices, such as a sidelink air interface between UEs 115.

In some cases, downlink communications and sidelink communications may have different logical channel identifiers. For sidelink communications, indexes four to 19 may be used as an identity of a logical channel. For downlink, indexes one to 32 may be used as an identity of a logical channel. In some cases, downlink communications and sidelink communications may be associated with different MAC control elements.

In some examples, the first link and the second link may each support transmission of transport blocks of a same size. For example, the source device may transmit message with a transport block of a certain size on the first link, and the relay node may also transmit a message with a transport block of that size on the second link to relay the information to the target node.

If the first link and the second link are a same type of interface, a relay node may be able to directly forward a transport block on the second link to the target node. However, if the first link and the second link correspond to different types of air interfaces, the target node may be unable to decode the directly forwarded transport block. For example, a MAC protocol data unit (PDU) and a MAC sub-header may have different formats for the first air interface and the second air interface. Wireless communications systems described herein, such as the wireless communications system 100, may support techniques for forwarding a transport block across different air interfaces.

For example, if a relay node receives a transport block over a first air interface to send to the target node over a second air interface, the relay node may indicate to the target node that the transport block is formatted in accordance with, or following a protocol of, the first air interface. For example, the relay node may send a message to the target node including the transport block and an indication that the transport block is formatted according to the first air interface.

The target node may receive the message and may decode the transport block based on the indication. For example, the relay node may perform physical layer decoding and demodulation using according to a first format of the first air interface to obtain a MAC PDU formatted in accordance with a protocol of the second air interface. Then, the target node may decode the transport block according to a second format of the second air interface, passing the transport block up a protocol stack of the second air interface to obtain the information from the source node.

Figure 2:
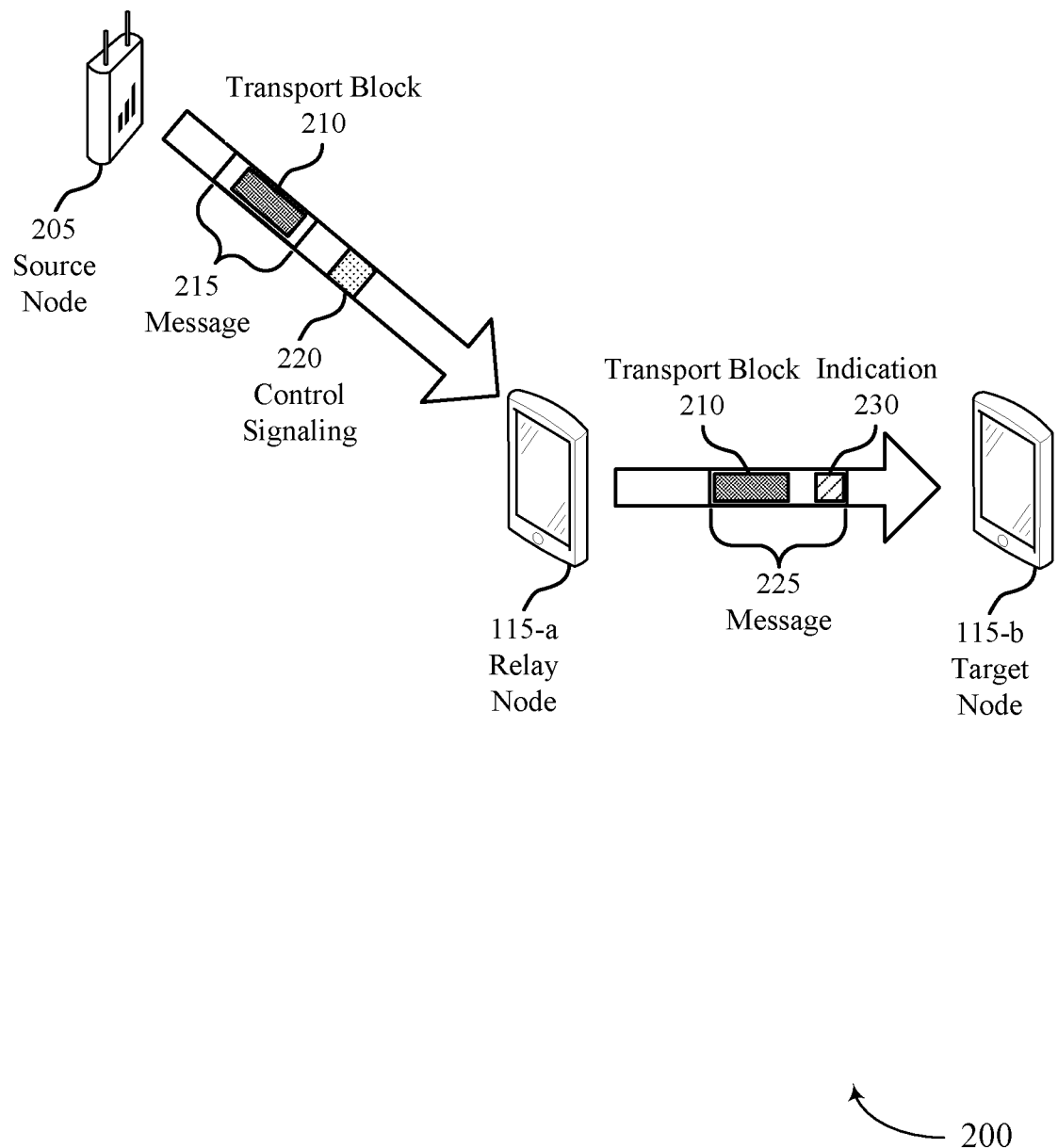
FIG. 2 illustrates an example of a wireless communications system that supports aspects of the present disclosure.

FIG. 2 illustrates an example of a wireless communications system 200 that supports aspects of the present disclosure. In some examples, the wireless communications system 200 may implement aspects of wireless communications system 100.

The wireless communications system 200 may include a source node 205, a relay node (e.g., UE 115-*a*) and a target node (e.g., UE 115-*b*). UE 115-*a* and UE 115-*b* may each be an example of a UE 115 as described with reference to FIG. 1. The source node 205 may be an example of a UE 115 or a base station 105 as described with reference to FIG. 1. UE 115-*a* may be configured to relay information between the source node 205 and UE 115-*b*, the target node. In some cases, UE 115-*a* may relay information to UE 115-*b*, or UE 115-*a* may relay information from UE 115-*b*.

UE 115-*a* may have a first link established with the source node 205 and a second link established with UE 115-*b*. In some cases, the first link may be an example of a radio air interface, such as a Uu interface, between UE 115-*a* and a radio access network of the source node 205. For example, the radio access network may provide one or more network communications or services such as NR or LTE. The second link may be an example of a radio air interface between wireless devices, such as a sidelink air interface between UEs 115.

In some examples, the first link and the second link may each support transmission of transport blocks of a same size. For example, the source node 205 may transmit a message 215 with a transport block 210 of a certain size on the first link, and UE 115-*a* may also transmit a message 225 with a transport block 210 of that size on the second link.

In some cases, if the first link and the second link are a same type of interface, a relay node may be able to directly forward the transport block 210 on the second link to the target node. For example, the relay node may receive a message from a source node with a transport block that is intended to be received by the target node. The relay node may perform demodulation and decoding of a received physical layer data channel from the source node to obtain the transport block, encode and modulate the transport block, and forward the transport block directly to the target node on the second link. However, if the first link and the second link correspond to different types of air interfaces, the target node may be unable to decode the directly forwarded transport block. For example, the target node may receive the transport block over the second link associated with the second type of air interface and assume the transport block follows the protocol of the second air interface. However, some formatting of a transport block may be different for the first air interface and the second air interface. For example, a MAC PDU format and a MAC sub-header format may be different for the different protocols. Therefore, the target node may be unable to decode the transport block, as the target node may be unaware that the transport block is formatted in accordance with the first air interface.

Techniques are described herein to support forwarding a transport block across different air interfaces. For example, if UE 115-*a* receives a transport block 210 over the first link to send to UE 115-*b* over the second link, UE 115-*a* may indicate to UE 115-*b* that the transport block 210 is formatted in accordance with, or following a protocol of, the first link. For example, UE 115-*a* may send an indication 230 to UE 115-*b* that the transport block 210 is formatted according to the first air interface. If the first air interface is a Uu air interface and the second air interface is a sidelink air interface, the indication 230 may inform UE 115-*b* that the transport block 210 is configured according to the Uu air interface protocol.

In some cases, the indication 230 may be transmitted via control signaling. For example, the indication 230 may be, or may be sent via, an indication field in a control channel associated with a data channel between UE 115-*a* and UE 115-*b*. In some examples, UE 115-*a* may send sidelink control information including the indication 230. For example, UE 115-*a* may relay a downlink transport block from the source node 205 (e.g., a gNB) to UE 115-*b*, and UE 115-*a* may send sidelink control information to indicate to UE 115-*b* that the associated sidelink shared channel data (e.g., physical sidelink shared channel (PSSCH) data) includes a Uu MAC packet.

UE 115-*b* may receive the indication 230 and the transport block 210, and UE 115-*b* may decode the transport block 210 based on the indication 230. For example, UE 115-*b* may perform physical layer decoding and demodulation using a sidelink protocol stack to obtain a MAC PDU, then UE 115-*b* may send the MAC PDU from the sidelink protocol stack to a Uu protocol stack to process or decode the MAC PDU. UE 115-*b* may then pass the packet up the Uu protocol stack to obtain the information from the source node 205.

In some cases, the source node 205 may send control signaling 220 to UE 115-*a*, configuring UE 115-*a* to forward the transport block 210 to UE 115-*b*. In some examples, the source node 205 may be a base station 105, and the sidelink communications between UE 115-*a* and UE 115-*b* may be configured by the source node 205. For example, the source node 205 may assign resources for the sidelink communications (e.g., according to a Transmission Mode 1 scheduling configuration). In some cases, the control signaling may configure UE 115-*a* to forward the transport block, and UE 115-*a* may determine to send the indication 230 based on the control signaling. In some examples, the control signaling may indicate that the first link is associated with the first air interface and the second link is associated with the second air interface. In some examples, the control signaling 220 may be transmitted via downlink control information. Additionally, or alternatively, the control signaling 220 may be RRC signaling. For example, the source node 205 may configure or enable the forwarding of the transport block 210 over different air interfaces via the RRC signaling.

Figure 3:
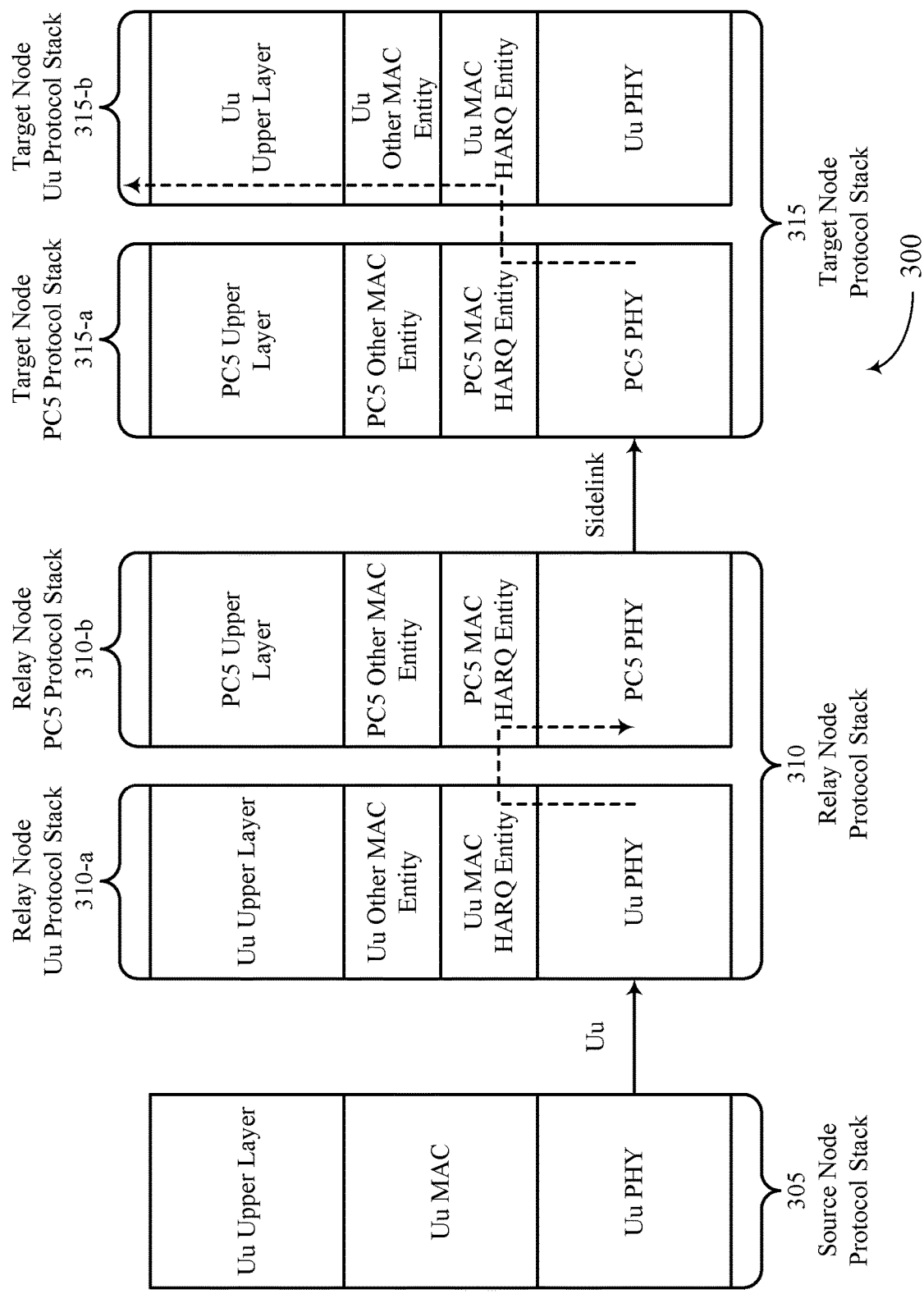
FIG. 3 illustrates an example of a transport block relay configuration that supports aspects of the present disclosure.

FIG. 3 illustrates an example of a transport block relay configuration 300 that supports aspects of the present disclosure In some examples, the transport block relay configuration 300 may implement aspects of wireless communications system 100.

A source node may transmit a message including a transport block over a first air interface to a relay node. The relay node may be configured to forward the transport block via a second air interface to a target node, or a destination node. The source node may process the transport block using a source node protocol stack 305, the relay node may process the transport block using a relay node protocol stack 310, and the target node may process the transport block using a target node protocol stack 315. A Uu interface may be an example of the first air interface between the source node and the relay node, and a sidelink interface, such as a PC5 interface, may be an example of the second air interface between the relay node and the target node. The techniques described herein support forwarding the transport block across the different air interfaces such that the target node can successfully decode the transport block.

The source node may generate the transport block according to the source node protocol stack 305. The source node may generate a MAC PDU formatted in accordance with the Uu protocol. The source node may modulate and encode the MAC PDU to obtain the transport block and transmit a first message including the transport block over the first air interface to the relay node.

The relay node may receive the first message including the transport block via the first air interface. The relay node may use relay node Uu protocol stack 310-*a* to demodulate and decode a physical layer data channel from the source node to obtain the transport block. The relay node may then use relay node PC5 protocol stack 310-*b* to encode and modulate the transport block. The relay node may transmit a second message including the transport block via the second air interface to the target node. In some cases, the relay node may send an indication to the target node, indicating that the transport block is following a protocol of the first air interface. For example, the relay node may include the indication in sidelink control information to inform the target node that the associated sidelink shared channel data includes a Uu MAC packet. In some cases, the indication may be included in the second message.

The target node may receive the second message from the relay node via the second air interface. The target node may decode or demodulate a physical layer of the second message in accordance with the format for the second air interface to obtain a MAC PDU which is formatted in accordance with the first air interface. For example, the target node may decode the second message at the physical layer using target node PC5 protocol stack 315-*a*. The target node may forward the PDU from a MAC layer of target node PC5 protocol stack 315-*a* to a MAC layer of target node Uu protocol stack 315-*b*. In some cases, the MAC PDU may be send from a PC5 MAC HARQ entity to a Uu MAC HARQ entity. The target node may then decode the MAC PDU in accordance with the format of the first air interface. For example, the target node may decode the MAC PDU using target node Uu protocol stack 315-*b*. The target node may decode the MAC PDU, passing the PDU up through the target node Uu protocol stack 315-*b* to obtain the information from the source node.

Figure 4:
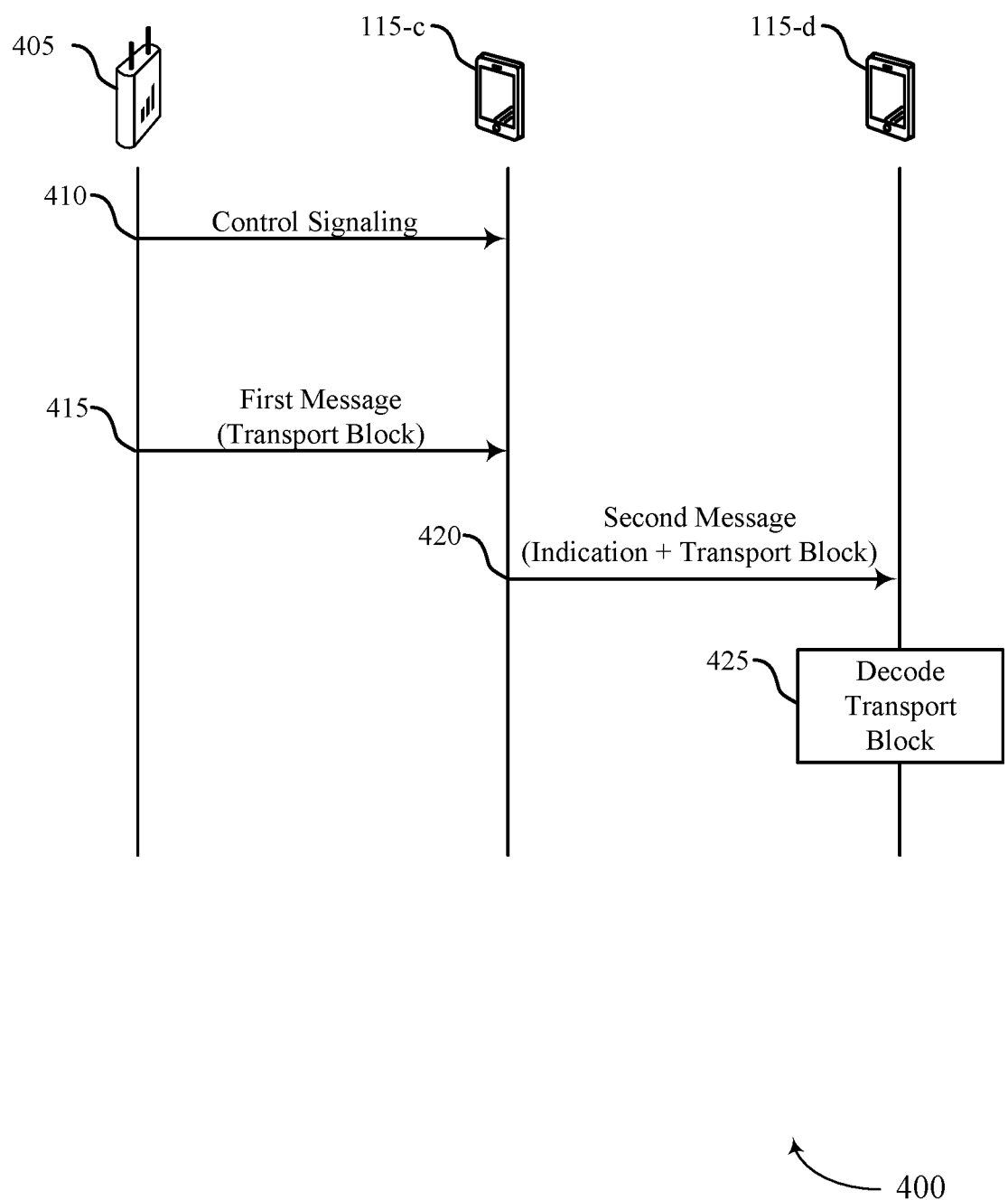
FIG. 4 illustrates an example of a process flow that supports aspects of the present disclosure.

FIG. 4 illustrates an example of a process flow 400 that supports aspects of the present disclosure In some examples, the process flow 400 may implement aspects of wireless communications system 100.

The process flow 400 may be implemented by a source device 405, UE 115-*c*, or UE 115-*d*, or any combination thereof. UE 115-*c* may operate as a relay device between the source device 405 and a target device such as UE 115-*d*. The source device 405 may transmit information to UE 115-*c* via a first air interface, and UE 115-*c* may relay the information to UE 115-*d* over a second air interface. In some cases, the first air interface and the second air interface may each support a same size transport block. Therefore, UE 115-*c* may be configured to directly forward a transport block, received from the source device 405, to UE 115-*d*. Techniques herein support forwarding a transport block across different air interfaces, such as the first air interface and the second air interface.

At 410, the source device 405 may transmit, to UE 115-*c*, control signaling configuring UE 115-*c* to receive a transport block via a first air interface and to forward the transport block to UE 115-*d* via a second air interface that is different than the first air interface. The first air interface and the second air interface may support a same size transport block. In some cases, the control signaling may be RRC signaling, downlink control information signaling, sidelink control information signaling, a MAC control element, or any combination thereof.

At 415, UE 115-c may receive, from the source node 205 via the first air interface, a first message including the transport block in a first format of the first air interface based on the control signaling. UE 115-c may determine that the first air format is different than the second air interface. While UE 115-c may support directly forwarding the transport block to UE 115-d over the second air interface, UE 115-d may be unable to decode the transport block by direct forwarding, as UE 115-d may assume that the transport block is encoded according to a second format of the second air interface. Therefore, UE 115-c may indicate to UE 115-d that the transport block is in the format of the first air interface.

At 420, UE 115-c may transmit, via the second interface to UE 115-d, a second message including the transport block and an indication that the transport block is in the format of the first air interface. In some cases, transmitting the second message includes transmitting sidelink control information that includes the indication that the transport block is in the format of the first air interface. In some cases, the second message may include the indication that a MAC packet included in the second message is in the format of the first air interface.

UE 115-c may receive the second message including the transport block and the indication. At 425, UE 115-c may decode the transport block from the message in accordance with the format of the air interface based on the indication. For example, UE 115-c may decode a physical layer of the message in accordance with the second format for the second interface to obtain a PDU including the transport block. Then, UE 115-c may decode the PDU in accordance with the format of the first air interface. An example of the decoding process may be described in more detail with reference to FIG. 3. By decoding the second message in accordance with the first air interface and the second air interface, UE 115-d may obtain the information from the source node 205, relayed by UE 115-c.

Figure 5:
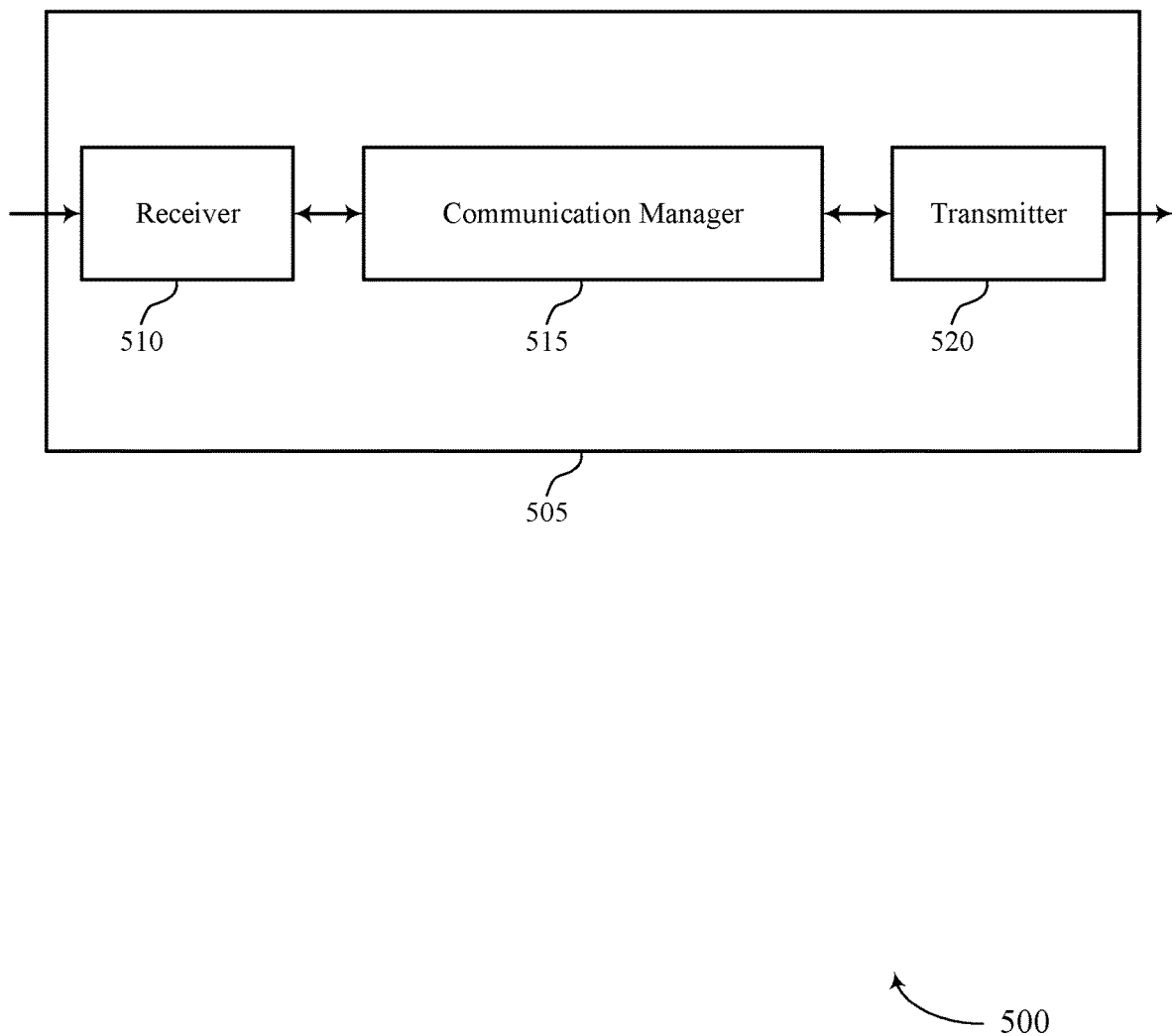
FIGS. 5 and 6 show block diagrams of devices that support aspects of the present disclosure.

FIG. 5 shows a block diagram 500 of a device 505 that supports aspects of the present disclosure. The device 505 may be an example of aspects of a UE 115 as described herein. The device 505 may include a receiver 510, a communication manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to transport block forwarding over different air interfaces, etc.). Information may be passed on to other components of the device 505. The receiver 510 may be an example of aspects of the transceiver 815 described with reference to FIG. 8. The receiver 510 may utilize a single antenna or a set of antennas.

The communication manager 515 may receive, from a source node, control signaling configuring the relay node to receive a transport block via a first air interface and to forward the transport block to a target node via a second air interface that is different than the first air interface, each of the first air interface and the second air interface supporting a same size transport block, receive, from the source node via the first air interface, a first message including the transport block in a format of the first air interface based on the control signaling, and transmit, via the second air interface to the target node, a second message including the transport block and an indication that the transport block is in the format of the first air interface. The communication manager 515 may also receive, from a relay node via a second air interface, a message including a transport block and an indication that the transport block is in a format of a first air interface that is different than the second air interface, each of the first air interface and the second air interface supporting a same size transport block and decode the transport block from the message in accordance with the format of the first air interface based on the indication. The communication manager 515 may be an example of aspects of the communication manager 810 described herein.

The communication manager 515, or its sub-components, may be implemented in hardware, code (e.g., software or firmware) executed by a processor, or any combination thereof. If implemented in code executed by a processor, the functions of the communication manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communication manager 515, or its sub-components, may be physically located at various positions, including being distributed such that portions of functions are implemented at different physical locations by one or more physical components. In some examples, the communication manager 515, or its sub-components, may be a separate and distinct component in accordance with various aspects of the present disclosure. In some examples, the communication manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 515 as described herein may be implemented to realize one or more potential advantages. One implementation may allow a target node, such as a UE 115, to successfully decode a transport block which was relayed across different types of air interfaces. Without an indication that a transport block is configured according to a different format, the target node may be unable to decode the transport block, as some portions of the transport block (e.g., MAC sub-headers) may have different formats for different sub-headers. These techniques may support directly forwarding transport blocks across different types of air interfaces, which may provide faster relay than some other techniques where the relay device may fully decode and configure the transport block for transmission via the different air interface.

The transmitter 520 may transmit signals generated by other components of the device 505. In some examples, the transmitter 520 may be collocated with a receiver 510 in a transceiver module. For example, the transmitter 520 may be an example of aspects of the transceiver 815 described with reference to FIG. 8. The transmitter 520 may utilize a single antenna or a set of antennas.

Figure 6:
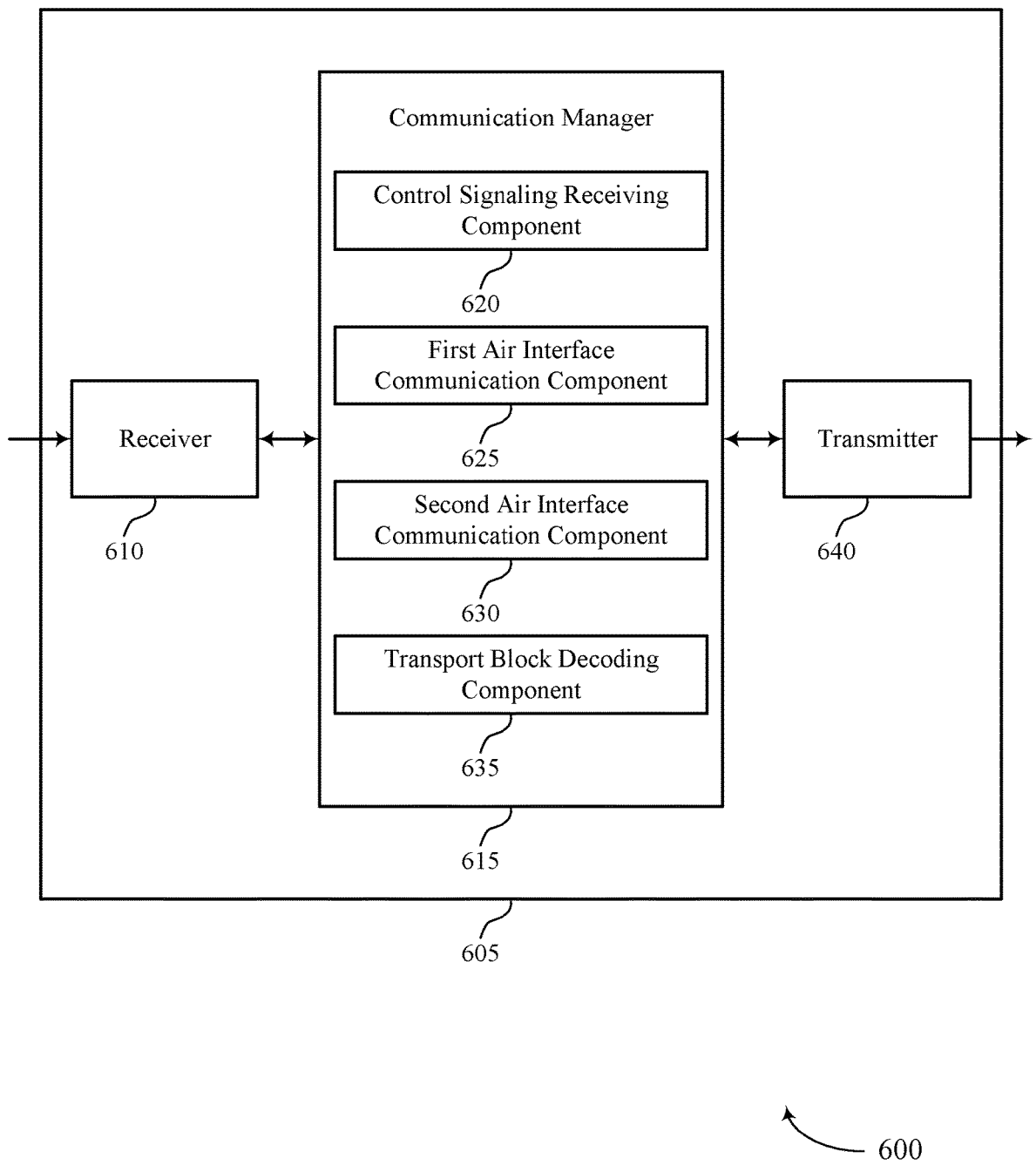

FIG. 6 shows a block diagram 600 of a device 605 that supports aspects of the present disclosure. The device 605 may be an example of aspects of a device 505, or a UE 115 as described herein. The device 605 may include a receiver 610, a communication manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to transport block forwarding over different air interfaces, etc.). Information may be passed on to other components of the device 605. The receiver 610 may be an example of aspects of the transceiver 815 described with reference to FIG. 8. The receiver 610 may utilize a single antenna or a set of antennas.

The communication manager 615 may be an example of aspects of the communication manager 515 as described herein. The communication manager 615 may include a control signaling receiving component 620, a first air interface communication component 625, a second air interface communication component 630, and a transport block decoding component 635. The communication manager 615 may be an example of aspects of the communication manager 810 described herein.

The control signaling receiving component 620 may receive, from a source node, control signaling configuring the relay node to receive a transport block via a first air interface and to forward the transport block to a target node via a second air interface that is different than the first air interface, each of the first air interface and the second air interface supporting a same size transport block. The first air interface communication component 625 may receive, from the source node via the first air interface, a first message including the transport block in a format of the first air interface based on the control signaling. The second air interface communication component 630 may transmit, via the second air interface to the target node, a second message including the transport block and an indication that the transport block is in the format of the first air interface.

The second air interface communication component 630 may receive, from a relay node via a second air interface, a message including a transport block and an indication that the transport block is in a format of a first air interface that is different than the second air interface, each of the first air interface and the second air interface supporting a same size transport block. The transport block decoding component 635 may decode the transport block from the message in accordance with the format of the first air interface based on the indication.

The transmitter 640 may transmit signals generated by other components of the device 605. In some examples, the transmitter 640 may be collocated with a receiver 610 in a transceiver module. For example, the transmitter 640 may be an example of aspects of the transceiver 815 described with reference to FIG. 8. The transmitter 640 may utilize a single antenna or a set of antennas.

Figure 7:
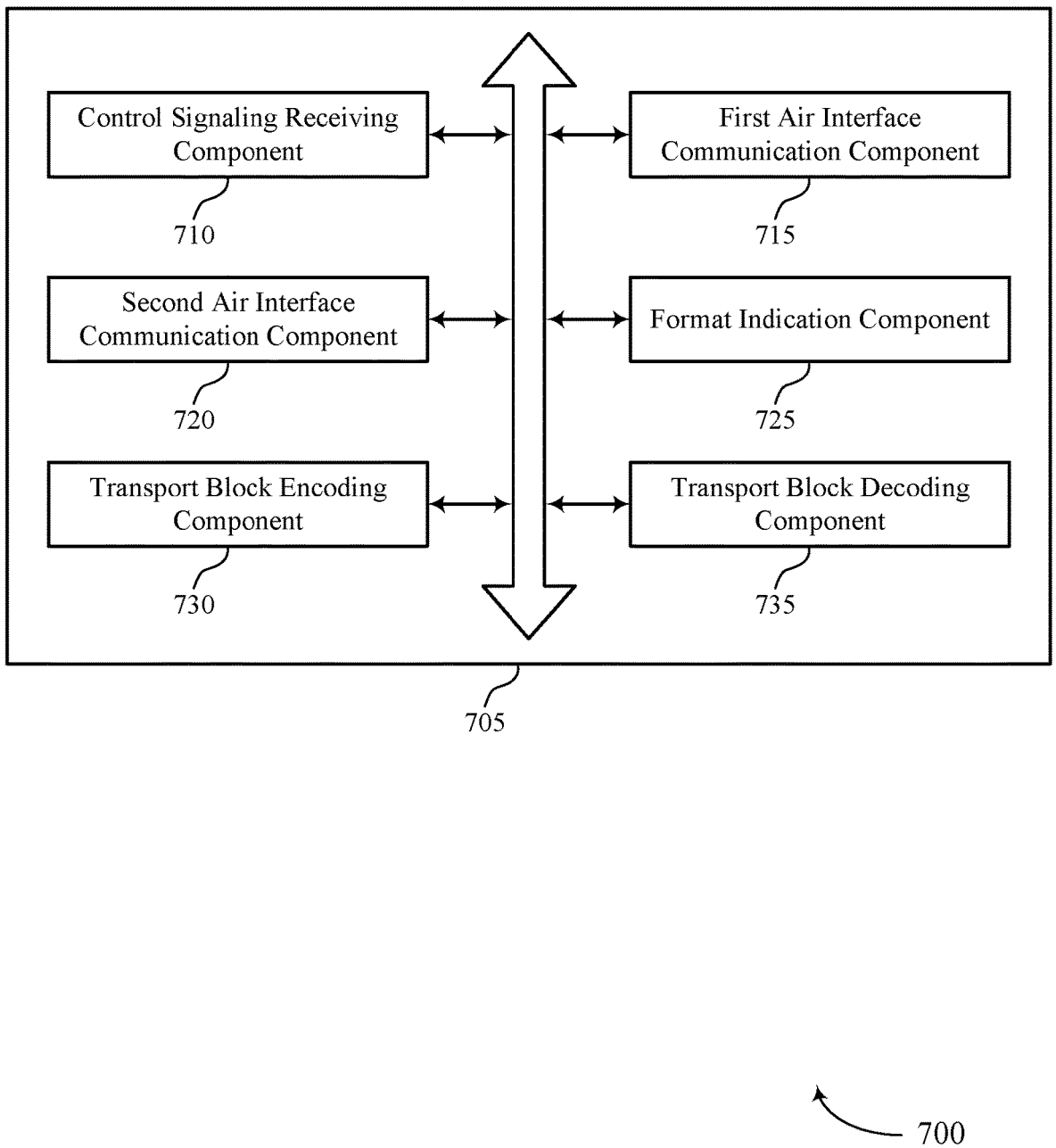
FIG. 7 shows a block diagram of a communication manager that supports aspects of the present disclosure.

FIG. 7 shows a block diagram 700 of a communication manager 705 that supports aspects of the present disclosure. The communication manager 705 may be an example of aspects of a communication manager 515, a communication manager 615, or a communication manager 810 described herein. The communication manager 705 may include a control signaling receiving component 710, a first air interface communication component 715, a second air interface communication component 720, a format indication component 725, a transport block encoding component 730, and a transport block decoding component 735. Each of these modules may communicate, directly or indirectly, with one another (e.g., via one or more buses).

The control signaling receiving component 710 may receive, from a source node, control signaling configuring the relay node to receive a transport block via a first air interface and to forward the transport block to a target node via a second air interface that is different than the first air interface, each of the first air interface and the second air interface supporting a same size transport block. The first air interface communication component 715 may receive, from the source node via the first air interface, a first message including the transport block in a format of the first air interface based on the control signaling.

The second air interface communication component 720 may transmit, via the second air interface to the target node, a second message including the transport block and an indication that the transport block is in the format of the first air interface. In some examples, the second air interface communication component 720 may receive, from a relay node via a second air interface, a message including a transport block and an indication that the transport block is in a format of a first air interface that is different than the second air interface, each of the first air interface and the second air interface supporting a same size transport block.

The transport block decoding component 735 may decode the transport block from the message in accordance with the format of the first air interface based on the indication. In some examples, the transport block decoding component 735 may decode a physical layer of the message in accordance with a second format for the second air interface to obtain a packet data unit including the transport block.

In some examples, the transport block decoding component 735 may decode the packet data unit in accordance with the format of the first air interface. In some examples, the transport block decoding component 735 may forward the packet data unit from a second medium access control layer of a second protocol stack of the second air interface to a first medium access control layer of a first protocol stack of the first air interface for decoding the packet data unit. In some examples, the packet data unit is forwarded from a first medium access control hybrid automatic repeat request entity of the first medium access control layer to a second medium access control hybrid automatic repeat request entity of the second medium access control layer.

The format indication component 725 may transmit the second message including sidelink control information that includes the indication that the transport block is in the format of the first air interface. In some examples, the format indication component 725 may transmit the second message including the indication that a medium access control packet included in the second message is in the format of the first air interface. In some examples, the format indication component 725 may receive the message including sidelink control information that includes the indication that the transport block is in the format of the first air interface. In some examples, the format indication component 725 may receive the message including the indication that a medium access control packet included in the message is in the format of the first air interface.

The transport block encoding component 730 may decode the first message according to the format of the first air interface to obtain a packet data unit including the transport block. In some examples, the transport block encoding component 730 may encode the packet data unit to generate the second message based on a second format of the second air interface. In some examples, the transport block encoding component 730 may forward the packet data unit from a first medium access control layer of a first protocol stack of the first air interface to a second medium access control layer of a second protocol stack of the second air interface for encoding to generate the second message.

Figure 8:
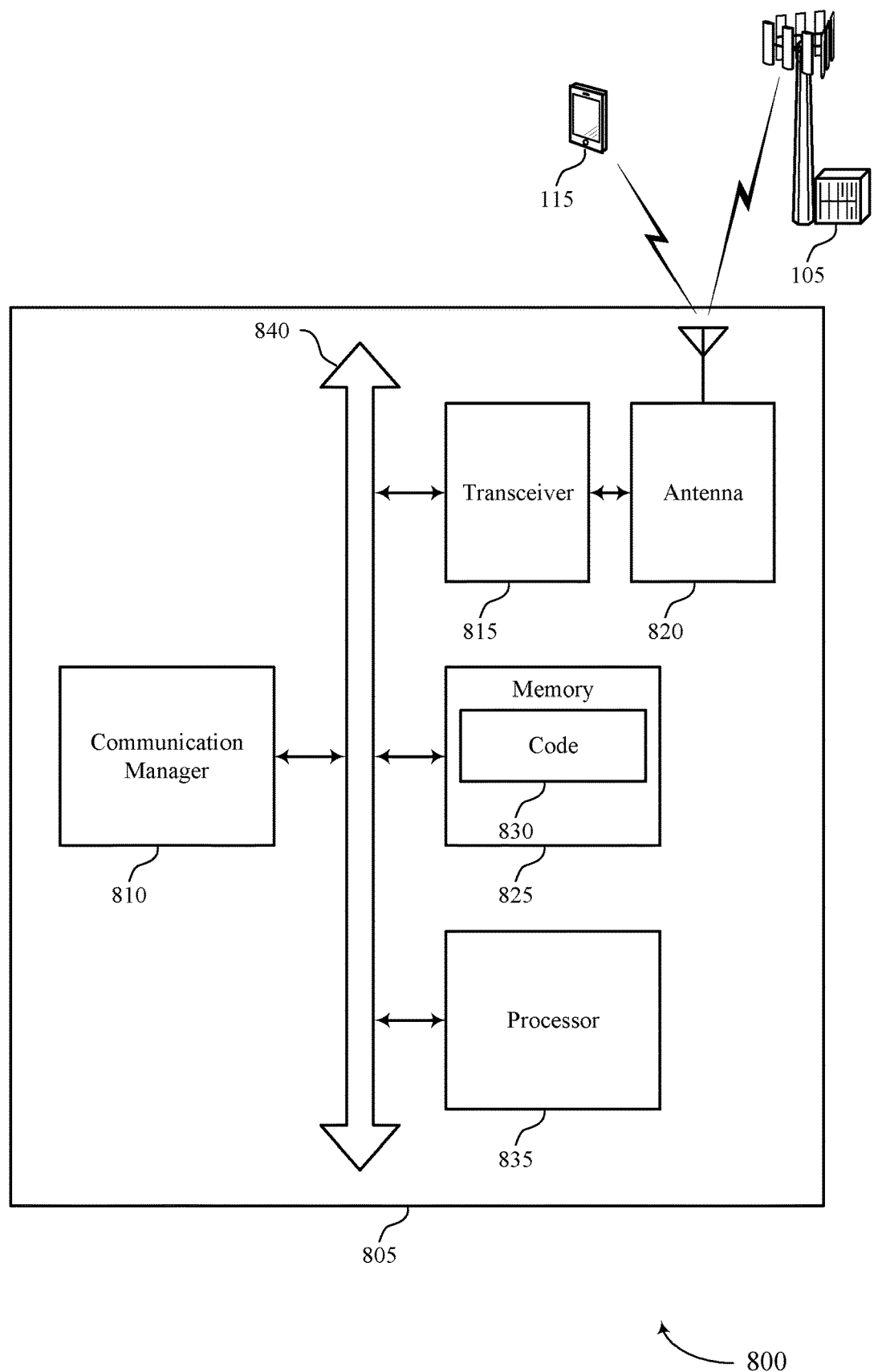
FIG. 8 shows a diagram of a system including a device that supports aspects of the present disclosure.

FIG. 8 shows a diagram of a system 800 including a device 805 that supports aspects of the present disclosure.

The device 805 may be an example of or include the components of device 505, device 605, or a UE 115 as described herein. The device 805 may include components for bi-directional voice and data communications including components for transmitting and receiving communications, including a communication manager 810, a transceiver 815, an antenna 820, memory 825, and a processor 835. These components may be in electronic communication via one or more buses (e.g., bus 840).

The communication manager 810 may receive, from a source node, control signaling configuring the relay node to receive a transport block via a first air interface and to forward the transport block to a target node via a second air interface that is different than the first air interface, each of the first air interface and the second air interface supporting a same size transport block, receive, from the source node via the first air interface, a first message including the transport block in a format of the first air interface based on the control signaling, and transmit, via the second air interface to the target node, a second message including the transport block and an indication that the transport block is in the format of the first air interface. The communication manager 810 may also receive, from a relay node via a second air interface, a message including a transport block and an indication that the transport block is in a format of a first air interface that is different than the second air interface, each of the first air interface and the second air interface supporting a same size transport block and decode the transport block from the message in accordance with the format of the first air interface based on the indication.

The transceiver 815 may communicate bi-directionally, via one or more antennas, wired, or wireless links as described above. For example, the transceiver 815 may represent a wireless transceiver and may communicate bi-directionally with another wireless transceiver. The transceiver 815 may also include a modem to modulate the packets and provide the modulated packets to the antennas for transmission, and to demodulate packets received from the antennas.

In some cases, the wireless device may include a single antenna 820. However, in some cases the device may have more than one antenna 820, which may be capable of concurrently transmitting or receiving multiple wireless transmissions.

The memory 825 may include random-access memory (RAM) and read-only memory (ROM). The memory 825 may store computer-readable, computer-executable code 830 including instructions that, when executed, cause the processor to perform various functions described herein. In some cases, the memory 825 may contain, among other things, a basic input/output system (BIOS) which may control basic hardware or software operation such as the interaction with peripheral components or devices.

The code 830 may include instructions to implement aspects of the present disclosure, including instructions to support wireless communications. The code 830 may be stored in a non-transitory computer-readable medium such as system memory or other type of memory. In some cases, the code 830 may not be directly executable by the processor 835 but may cause a computer (e.g., when compiled and executed) to perform functions described herein.

The processor 835 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 835 may be configured to operate a memory array using a memory controller. In other cases, a memory controller may be integrated into the processor 835. The processor 835 may be configured to execute computer-readable instructions stored in a memory (e.g., the memory 825) to cause the device 805 to perform various functions (e.g., functions or tasks supporting transport block forwarding over different air interfaces).

Figure 9:
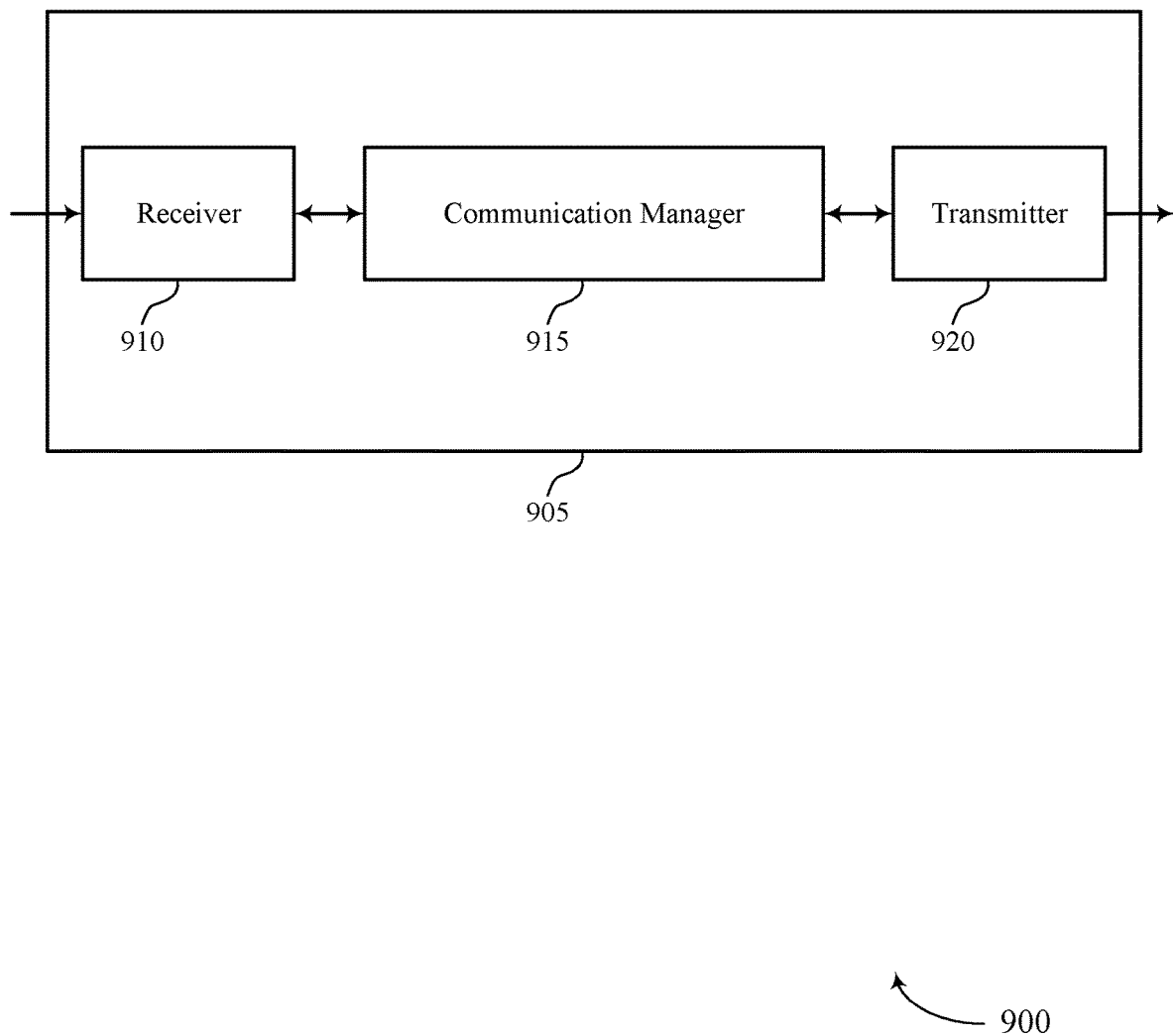
FIGS. 9 and 10 show block diagrams of devices that support aspects of the present disclosure.

FIG. 9 shows a block diagram 900 of a device 905 that supports aspects of the present disclosure. The device 905 may be an example of aspects of a base station 105 as described herein. The device 905 may include a receiver 910, a communication manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to transport block forwarding over different air interfaces, etc.). Information may be passed on to other components of the device 905. The receiver 910 may be an example of aspects of the transceiver 1220 described with reference to FIG. 12. The receiver 910 may utilize a single antenna or a set of antennas.

The communication manager 915 may transmit, to a relay node, control signaling configuring the relay node to receive a transport block via a first air interface and to forward the transport block to a target node via a second air interface that is different than the first air interface, each of the first air interface and the second air interface supporting a same size transport block and transmit, to the relay node via the first air interface, a first message including the transport block in a format of the first air interface based on the control signaling. The communication manager 915 may be an example of aspects of the communication manager 1210 described herein.

The communication manager 915, or its sub-components, may be implemented in hardware, code (e.g., software or firmware) executed by a processor, or any combination thereof. If implemented in code executed by a processor, the functions of the communication manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communication manager 915, or its sub-components, may be physically located at various positions, including being distributed such that portions of functions are implemented at different physical locations by one or more physical components. In some examples, the communication manager 915, or its sub-components, may be a separate and distinct component in accordance with various aspects of the present disclosure. In some examples, the communication manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
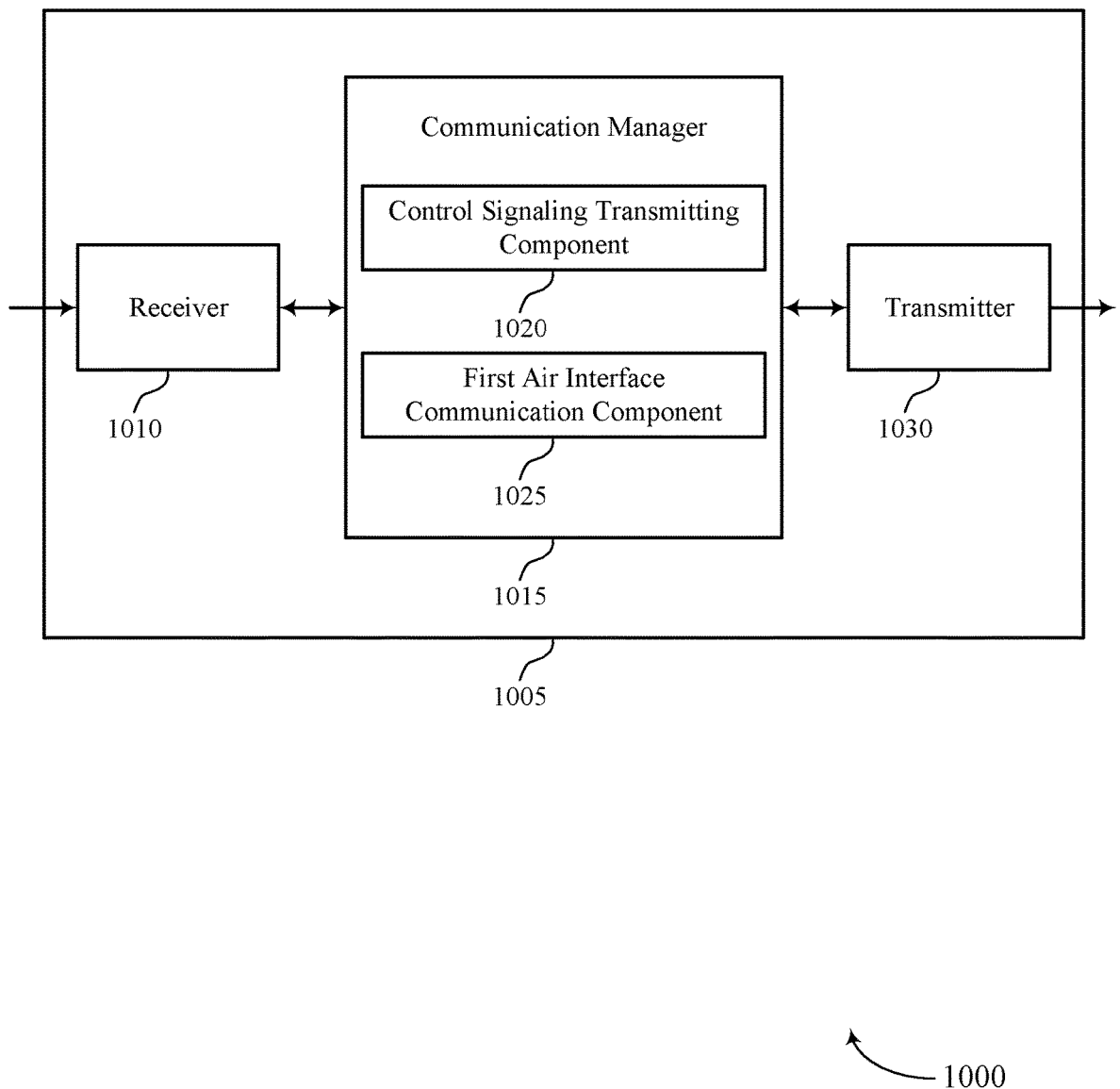

FIG. 10 shows a block diagram 1000 of a device 1005 that supports aspects of the present disclosure. The device 1005 may be an example of aspects of a device 905, or a base station 105 as described herein. The device 1005 may include a receiver 1010, a communication manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to transport block forwarding over different air interfaces, etc.). Information may be passed on to other components of the device 1005. The receiver 1010 may be an example of aspects of the transceiver 1220 described with reference to FIG. 12. The receiver 1010 may utilize a single antenna or a set of antennas.

The communication manager 1015 may be an example of aspects of the communication manager 915 as described herein. The communication manager 1015 may include a control signaling transmitting component 1020 and a first air interface communication component 1025. The communication manager 1015 may be an example of aspects of the communication manager 1210 described herein.

The control signaling transmitting component 1020 may transmit, to a relay node, control signaling configuring the relay node to receive a transport block via a first air interface and to forward the transport block to a target node via a second air interface that is different than the first air interface, each of the first air interface and the second air interface supporting a same size transport block.

The first air interface communication component 1025 may transmit, to the relay node via the first air interface, a first message including the transport block in a format of the first air interface based on the control signaling.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
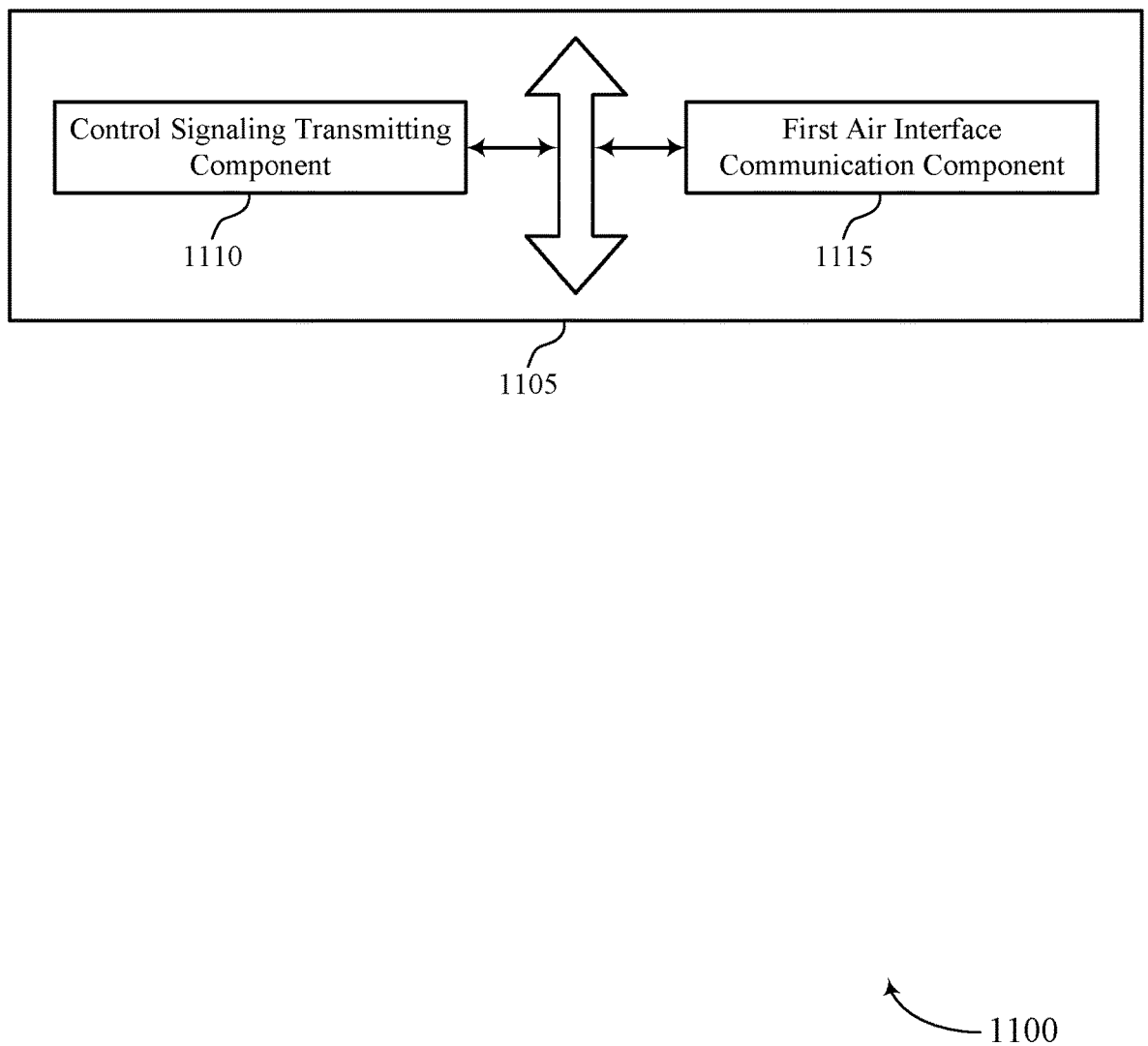
FIG. 11 shows a block diagram of a communication manager that supports aspects of the present disclosure.

FIG. 11 shows a block diagram 1100 of a communication manager 1105 that supports aspects of the present disclosure. The communication manager 1105 may be an example of aspects of a communication manager 915, a communication manager 1015, or a communication manager 1210 described herein. The communication manager 1105 may include a control signaling transmitting component 1110 and a first air interface communication component 1115. Each of these modules may communicate, directly or indirectly, with one another (e.g., via one or more buses).

The control signaling transmitting component 1110 may transmit, to a relay node, control signaling configuring the relay node to receive a transport block via a first air interface and to forward the transport block to a target node via a second air interface that is different than the first air interface, each of the first air interface and the second air interface supporting a same size transport block.

The first air interface communication component 1115 may transmit, to the relay node via the first air interface, a first message including the transport block in a format of the first air interface based on the control signaling.

Figure 12:
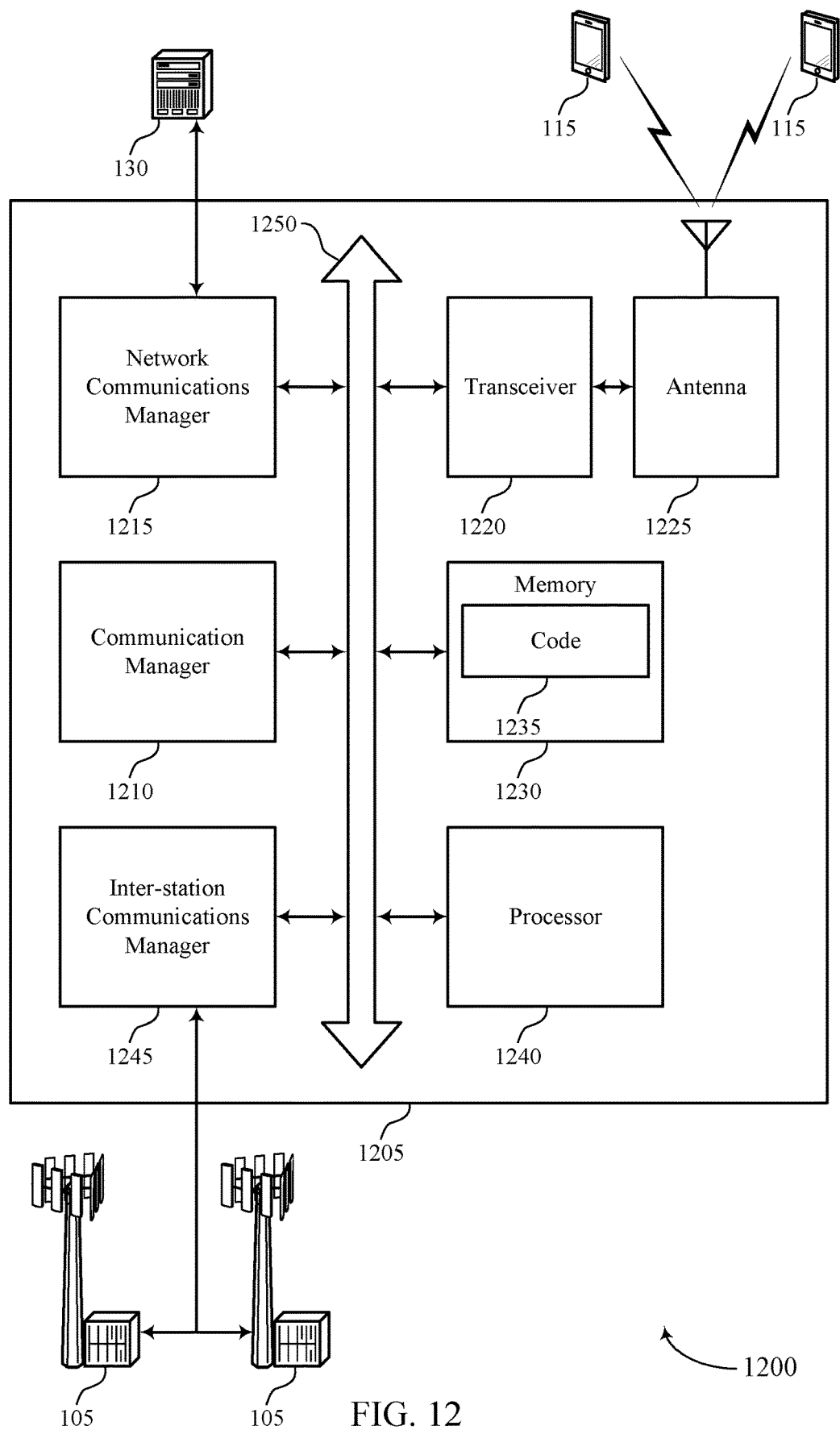
FIG. 12 shows a diagram of a system including a device that supports aspects of the present disclosure.

FIG. 12 shows a diagram of a system 1200 including a device 1205 that supports aspects of the present disclosure. The device 1205 may be an example of or include the components of device 905, device 1005, or a base station 105 as described herein. The device 1205 may include components for bi-directional voice and data communications including components for transmitting and receiving communications, including a communication manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communication manager 1210 may transmit, to a relay node, control signaling configuring the relay node to receive a transport block via a first air interface and to forward the transport block to a target node via a second air interface that is different than the first air interface, each of the first air interface and the second air interface supporting a same size transport block and transmit, to the relay node via the first air interface, a first message including the transport block in a format of the first air interface based on the control signaling.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 1230 may contain, among other things, a BIOS which may control basic hardware or software operation such as the interaction with peripheral components or devices.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting transport block forwarding over different air interfaces).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

Figure 13:
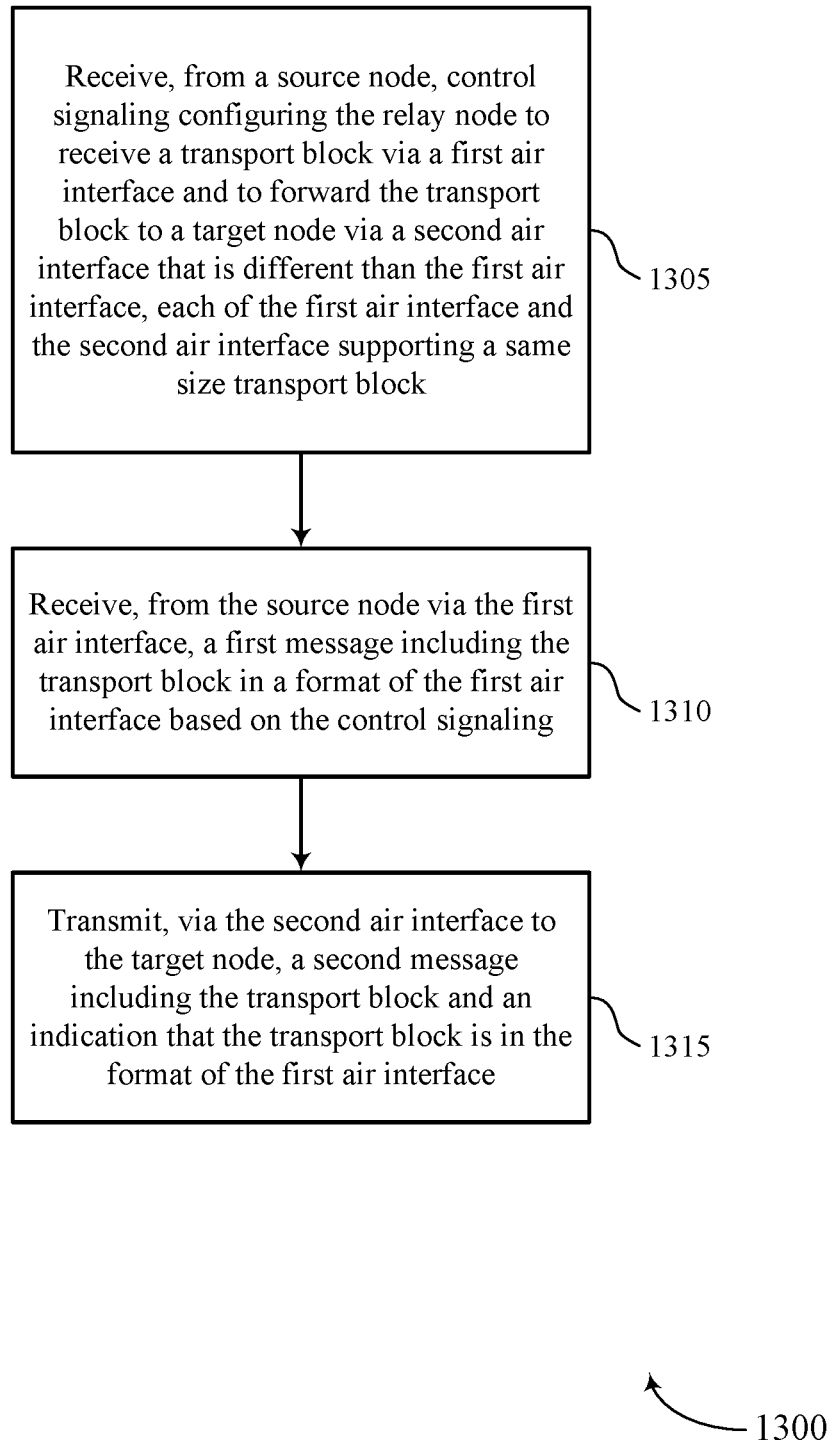
FIGS. 13 through 16 show flowcharts illustrating methods that support aspects of the present disclosure.

FIG. 13 shows a flowchart illustrating a method 1300 that supports aspects of the present disclosure. The operations of method 1300 may be implemented by a UE 115 or its components as described herein. For example, the operations of method 1300 may be performed by a communication manager as described with reference to FIGS. 5 through 8. In some examples, a UE may execute a set of instructions to control the functional elements of the UE to perform the described functions. Additionally, or alternatively, a UE may perform aspects of the described functions using special-purpose hardware.

At 1305, the UE may receive, from a source node, control signaling configuring the relay node to receive a transport block via a first air interface and to forward the transport block to a target node via a second air interface that is different than the first air interface, each of the first air interface and the second air interface supporting a same size transport block. The operations of 1305 may be performed according to the methods described herein. In some examples, aspects of the operations of 1305 may be performed by a control signaling receiving component as described with reference to FIGS. 5 through 8.

At 1310, the UE may receive, from the source node via the first air interface, a first message including the transport block in a format of the first air interface based on the control signaling. The operations of 1310 may be performed according to the methods described herein. In some examples, aspects of the operations of 1310 may be performed by a first air interface communication component as described with reference to FIGS. 5 through 8.

At 1315, the UE may transmit, via the second air interface to the target node, a second message including the transport block and an indication that the transport block is in the format of the first air interface. The operations of 1315 may be performed according to the methods described herein. In some examples, aspects of the operations of 1315 may be performed by a second air interface communication component as described with reference to FIGS. 5 through 8.

Figure 14:
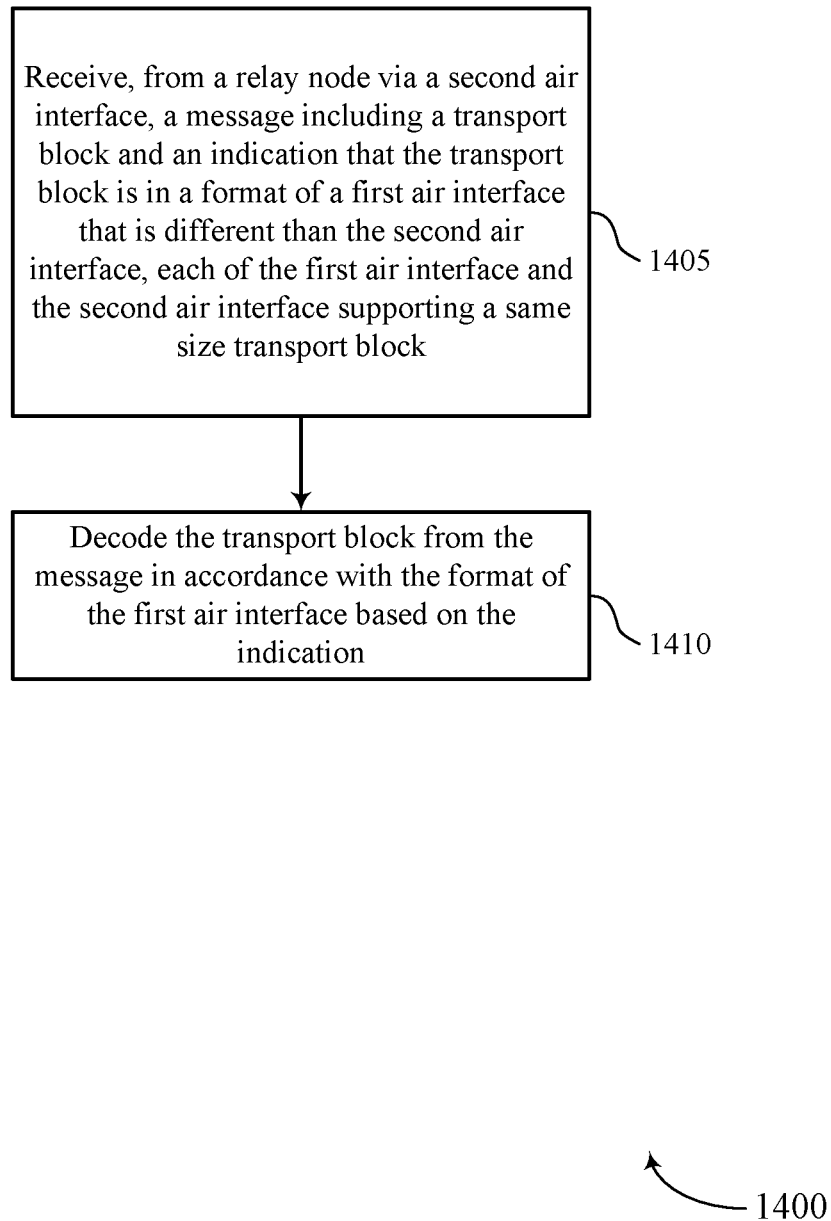

FIG. 14 shows a flowchart illustrating a method 1400 that supports aspects of the present disclosure. The operations of method 1400 may be implemented by a UE 115 or its components as described herein. For example, the operations of method 1400 may be performed by a communication manager as described with reference to FIGS. 5 through 8. In some examples, a UE may execute a set of instructions to control the functional elements of the UE to perform the described functions. Additionally, or alternatively, a UE may perform aspects of the described functions using special-purpose hardware.

At 1405, the UE may receive, from a relay node via a second air interface, a message including a transport block and an indication that the transport block is in a format of a first air interface that is different than the second air interface, each of the first air interface and the second air interface supporting a same size transport block. The operations of 1405 may be performed according to the methods described herein. In some examples, aspects of the operations of 1405 may be performed by a second air interface communication component as described with reference to FIGS. 5 through 8.

At 1410, the UE may decode the transport block from the message in accordance with the format of the first air interface based on the indication. The operations of 1410 may be performed according to the methods described herein. In some examples, aspects of the operations of 1410 may be performed by a transport block decoding component as described with reference to FIGS. 5 through 8.

Figure 15:
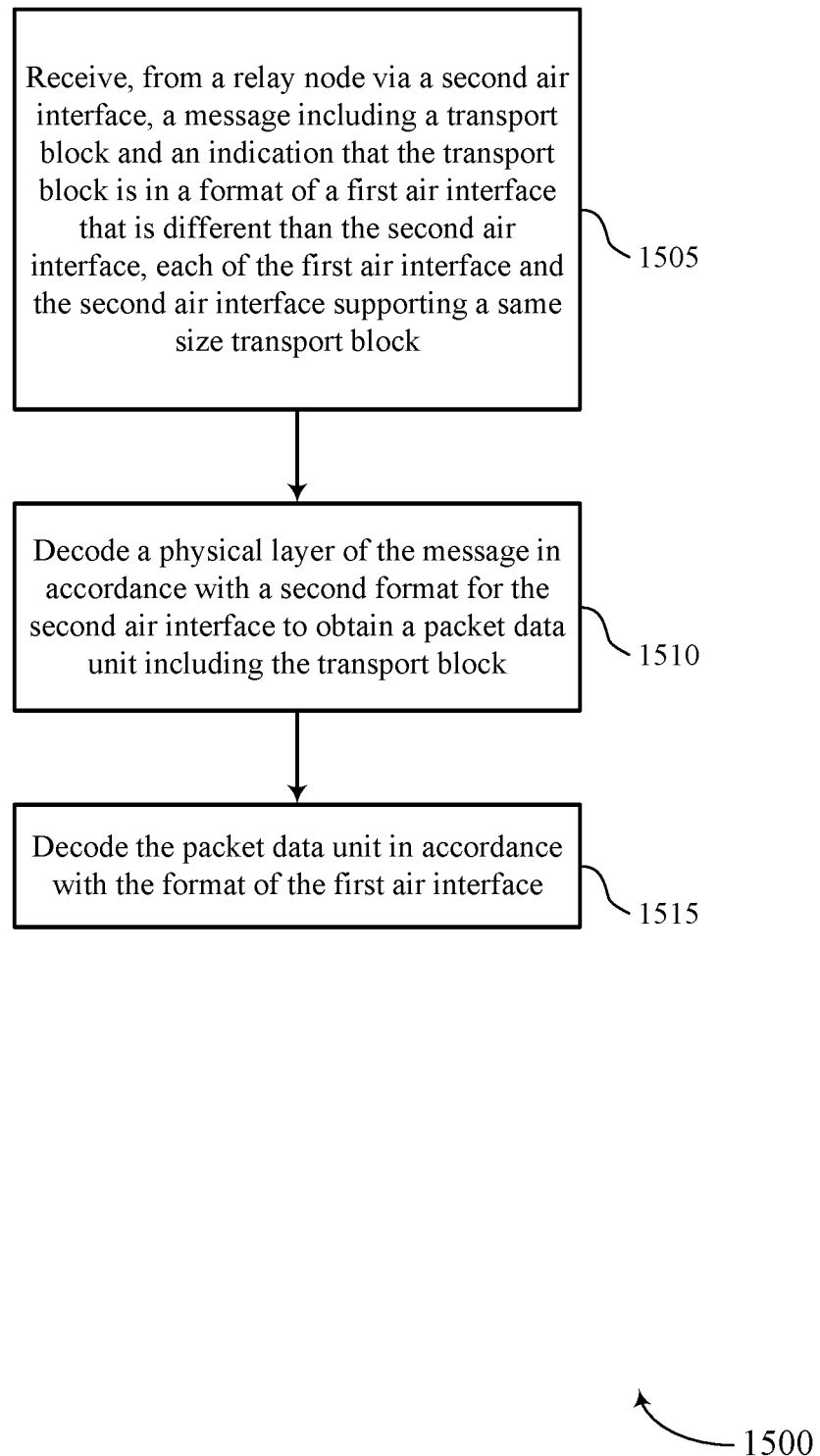

FIG. 15 shows a flowchart illustrating a method 1500 that supports aspects of the present disclosure. The operations of method 1500 may be implemented by a UE 115 or its components as described herein. For example, the operations of method 1500 may be performed by a communication manager as described with reference to FIGS. 5 through 8. In some examples, a UE may execute a set of instructions to control the functional elements of the UE to perform the described functions. Additionally, or alternatively, a UE may perform aspects of the described functions using special-purpose hardware.

At 1505, the UE may receive, from a relay node via a second air interface, a message including a transport block and an indication that the transport block is in a format of a first air interface that is different than the second air interface, each of the first air interface and the second air interface supporting a same size transport block. The operations of 1505 may be performed according to the methods described herein. In some examples, aspects of the operations of 1505 may be performed by a second air interface communication component as described with reference to FIGS. 5 through 8.

At 1510, the UE may decode a physical layer of the message in accordance with a second format for the second air interface to obtain a packet data unit including the transport block. The operations of 1510 may be performed according to the methods described herein. In some examples, aspects of the operations of 1510 may be performed by a transport block decoding component as described with reference to FIGS. 5 through 8.

At 1515, the UE may decode the packet data unit in accordance with the format of the first air interface. The operations of 1515 may be performed according to the methods described herein. In some examples, aspects of the operations of 1515 may be performed by a transport block decoding component as described with reference to FIGS. 5 through 8.

Figure 16:
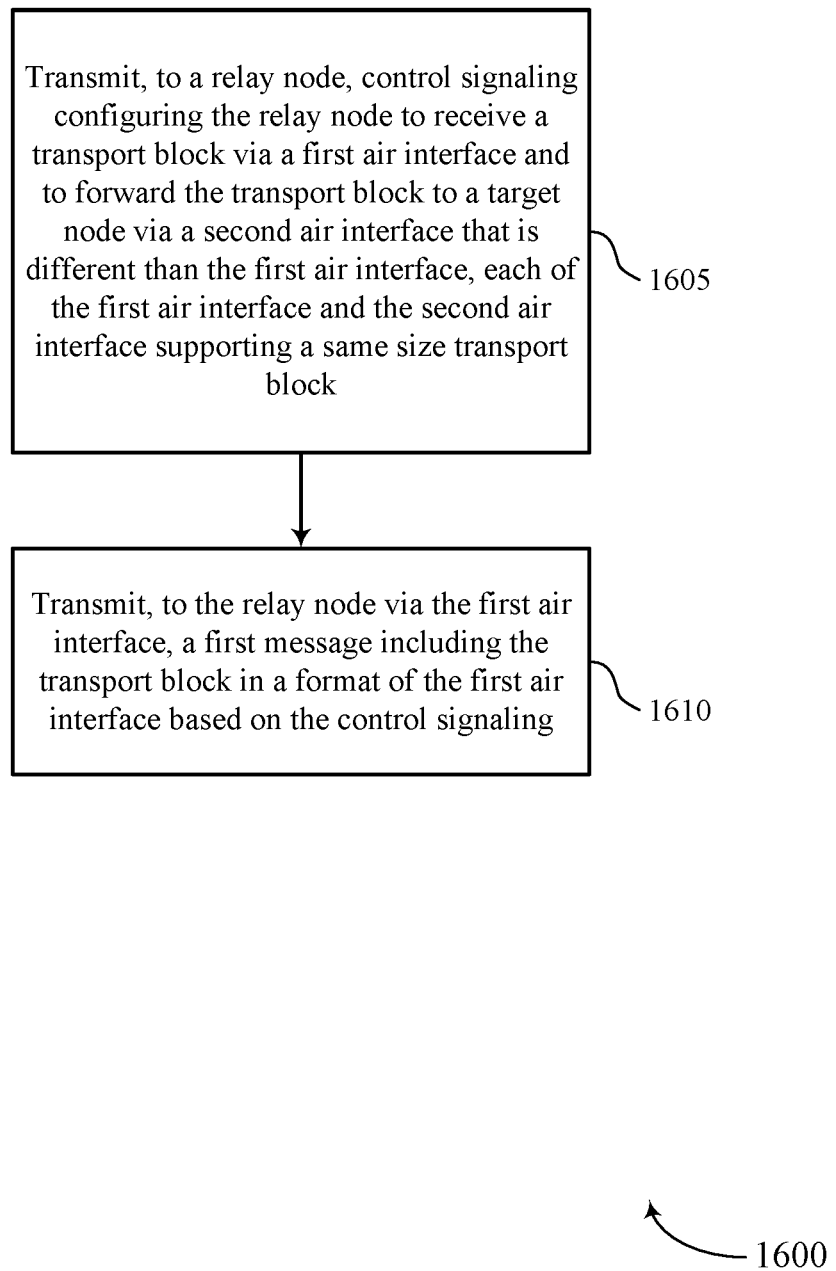

FIG. 16 shows a flowchart illustrating a method 1600 that supports aspects of the present disclosure. The operations of method 1600 may be implemented by a base station 105 or its components as described herein. For example, the operations of method 1600 may be performed by a communication manager as described with reference to FIGS. 9 through 12. In some examples, a base station may execute a set of instructions to control the functional elements of the base station to perform the described functions. Additionally, or alternatively, a base station may perform aspects of the described functions using special-purpose hardware.

At 1605, the base station may transmit, to a relay node, control signaling configuring the relay node to receive a transport block via a first air interface and to forward the transport block to a target node via a second air interface that is different than the first air interface, each of the first air interface and the second air interface supporting a same size transport block. The operations of 1605 may be performed according to the methods described herein. In some examples, aspects of the operations of 1605 may be performed by a control signaling transmitting component as described with reference to FIGS. 9 through 12.

At 1610, the base station may transmit, to the relay node via the first air interface, a first message including the transport block in a format of the first air interface based on the control signaling. The operations of 1610 may be performed according to the methods described herein. In some examples, aspects of the operations of 1610 may be performed by a first air interface communication component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Aspect 1: A method for wireless communications at a relay node, comprising: receiving, from a source node, control signaling configuring the relay node to receive a transport block via a first air interface and to forward the transport block to a target node via a second air interface that is different than the first air interface, each of the first air interface and the second air interface supporting a same size transport block; receiving, from the source node via the first air interface, a first message comprising the transport block in a format of the first air interface based at least in part on the control signaling; and transmitting, via the second air interface to the target node, a second message comprising the transport block and an indication that the transport block is in the format of the first air interface.

Aspect 2: The method of aspect 1, wherein transmitting the second message comprises: transmitting the second message comprising sidelink control information that includes the indication that the transport block is in the format of the first air interface.

Aspect 3: The method of any of aspects 1 or 2, wherein transmitting the second message comprises: transmitting the second message comprising the indication that a medium access control packet included in the second message is in the format of the first air interface.

Aspect 4: The method of any of aspects 1 to 3, wherein receiving the first message comprises: decoding the first message according to the format of the first air interface to obtain a packet data unit comprising the transport block; and encoding the packet data unit to generate the second message based at least in part on a second format of the second air interface.

Aspect 5: The method of aspect 4, further comprising: forwarding the packet data unit from a first medium access control layer of a first protocol stack of the first air interface to a second medium access control layer of a second protocol stack of the second air interface for encoding to generate the second message.

Aspect 6: The method of any of aspects 1 to 5, wherein the first air interface is a radio air interface between the relay node and a radio access network of the source node, and the second air interface is a sidelink air interface.

Aspect 7: The method of any of aspects 1 to 6, wherein the relay node is a first UE, the target node is a second UE, and the source node is a base station.

Aspect 8: A method for wireless communications at a target node, comprising: receiving, from a relay node via a second air interface, a message comprising a transport block and an indication that the transport block is in a format of a first air interface that is different than the second air interface, each of the first air interface and the second air interface supporting a same size transport block; and decoding the transport block from the message in accordance with the format of the first air interface based at least in part on the indication.

Aspect 9: The method of aspect 8, wherein receiving the message comprises: receiving the message comprising sidelink control information that includes the indication that the transport block is in the format of the first air interface.

Aspect 10: The method of any of aspects 8 or 9, wherein receiving the message comprises: receiving the message comprising the indication that a medium access control packet included in the message is in the format of the first air interface.

Aspect 11: The method of any of aspects 8 to 10, wherein decoding the transport block comprises: decoding a physical layer of the message in accordance with a second format for the second air interface to obtain a packet data unit comprising the transport block; and decoding the packet data unit in accordance with the format of the first air interface.

Aspect 12: The method of aspect 11, further comprising: forwarding the packet data unit from a second medium access control layer of a second protocol stack of the second air interface to a first medium access control layer of a first protocol stack of the first air interface for decoding the packet data unit.

Aspect 13: The method of any of aspects 8 to 12, wherein the first air interface is a radio air interface between the relay node and a radio access network of a source node, and the second air interface is a sidelink air interface.

Aspect 14: The method of any of aspects 8 to 13, wherein the relay node is a first UE, the target node is a second UE, and a source node is a base station.

Aspect 15: A method for wireless communications at a source node, comprising: transmitting, to a relay node, control signaling configuring the relay node to receive a transport block via a first air interface and to forward the transport block to a target node via a second air interface that is different than the first air interface, each of the first air interface and the second air interface supporting a same size transport block; and transmitting, to the relay node via the first air interface, a first message comprising the transport block in a format of the first air interface based at least in part on the control signaling.

Aspect 16: The method of aspect 15, wherein the first air interface is a radio air interface between the relay node and a radio access network of the source node, and the second air interface is a sidelink air interface.

Aspect 17: The method of any of aspects 15 or 16, wherein the relay node is a first UE, the target node is a second UE, and the source node is a base station.

Aspect 18: An apparatus comprising at least one means for performing a method of any of aspects 1 to 7.

Aspect 19: An apparatus for wireless communications comprising a processor; memory in electronic communication with the processor; and instructions stored in the memory and executable by the processor to cause the apparatus to perform a method of any of aspects 1 to 7.

Aspect 20: A non-transitory computer-readable medium storing code for wireless communications, the code comprising instructions executable by a processor to perform a method of any of aspects 1 to 7.

Aspect 21: An apparatus comprising at least one means for performing a method of any of aspects 8 to 14.

Aspect 22: An apparatus for wireless communications comprising a processor; memory in electronic communication with the processor; and instructions stored in the memory and executable by the processor to cause the apparatus to perform a method of any of aspects 8 to 14.

Aspect 23: A non-transitory computer-readable medium storing code for wireless communications, the code comprising instructions executable by a processor to perform a method of any of aspects 8 to 14.

Aspect 24: An apparatus comprising at least one means for performing a method of any of aspects 15 to 17.

Aspect 25: An apparatus for wireless communications comprising a processor; memory in electronic communication with the processor; and instructions stored in the memory and executable by the processor to cause the apparatus to perform a method of any of aspects 15 to 17.

Aspect 26: A non-transitory computer-readable medium storing code for wireless communications, the code comprising instructions executable by a processor to perform a method of any of aspects 15 to 17.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a relay node, comprising:
   a processor;
   memory coupled with the processor; and
   instructions stored in the memory and executable by the processor to cause the apparatus to:
      receive, from a source node, control signaling configuring the relay node to receive a transport block via a first air interface and to forward the transport block to a target node via a second air interface that is different than the first air interface, each of the first air interface and the second air interface supporting a same size transport block;
      receive, from the source node via the first air interface, a first message comprising the transport block in a format of the first air interface based at least in part on the control signaling; and
      transmit, via the second air interface to the target node, a second message comprising the transport block and an indication that the transport block is in the format of the first air interface.

2. The apparatus of claim 1, wherein the instructions to transmit the second message are executable by the processor to cause the apparatus to:
   transmit the second message comprising sidelink control information that includes the indication that the transport block is in the format of the first air interface.

3. The apparatus of claim 1, wherein the instructions to transmit the second message are executable by the processor to cause the apparatus to:
   transmit the second message comprising the indication that a medium access control packet included in the second message is in the format of the first air interface.

4. The apparatus of claim 1, wherein the instructions to receive the first message are executable by the processor to cause the apparatus to:
   decode the first message according to the format of the first air interface to obtain a packet data unit comprising the transport block; and
   encode the packet data unit to generate the second message based at least in part on a second format of the second air interface.

5. The apparatus of claim 4, wherein the instructions are further executable by the processor to cause the apparatus to:
   forward the packet data unit from a first medium access control layer of a first protocol stack of the first air interface to a second medium access control layer of a second protocol stack of the second air interface for encoding to generate the second message.

6. The apparatus of claim 5, wherein the packet data unit is forwarded from a first medium access control hybrid automatic repeat request entity of the first medium access control layer to a second medium access control hybrid automatic repeat request entity of the second medium access control layer.

7. The apparatus of claim 1, wherein the first air interface is a radio air interface between the relay node and a radio access network of the source node, and the second air interface is a sidelink air interface.

8. The apparatus of claim 1, wherein the relay node is a first user equipment (UE), the target node is a second UE, and the source node is a base station.

9. The apparatus of claim 1, wherein the instructions are further executable by the processor to cause the apparatus to:
   transmit sidelink control information that includes the indication that the transport block is in the format of the first air interface.

10. The apparatus of claim 1, wherein the second message includes a sidelink data message.

11. An apparatus for wireless communications at a target node, comprising:
    a processor;
    memory coupled with the processor; and
    instructions stored in the memory and executable by the processor to cause the apparatus to:
       receive, from a relay node via a second air interface, a message comprising a transport block and an indication that the transport block is in a format of a first air interface that is different than the second air interface, each of the first air interface and the second air interface supporting a same size transport block; and
       decode the transport block from the message in accordance with the format of the first air interface based at least in part on the indication.

12. The apparatus of claim 11, wherein the instructions to receive the message are executable by the processor to cause the apparatus to:
    receive the message comprising sidelink control information that includes the indication that the transport block is in the format of the first air interface.

13. The apparatus of claim 11, wherein the instructions to receive the message are executable by the processor to cause the apparatus to:
    receive the message comprising the indication that a medium access control packet included in the message is in the format of the first air interface.

14. The apparatus of claim 11, wherein the instructions to decode the transport block are executable by the processor to cause the apparatus to:
    decode a physical layer of the message in accordance with a second format for the second air interface to obtain a packet data unit comprising the transport block; and
    decode the packet data unit in accordance with the format of the first air interface.

15. The apparatus of claim 14, wherein the instructions are further executable by the processor to cause the apparatus to:
    forward the packet data unit from a second medium access control layer of a second protocol stack of the second air interface to a first medium access control layer of a first protocol stack of the first air interface for decoding the packet data unit.

16. The apparatus of claim 15, wherein the packet data unit is forwarded from a first medium access control hybrid automatic repeat request entity of the first medium access control layer to a second medium access control hybrid automatic repeat request entity of the second medium access control layer.

17. The apparatus of claim 11, wherein the first air interface is a radio air interface between the relay node and a radio access network of a source node, and the second air interface is a sidelink air interface.

18. The apparatus of claim 11, wherein the relay node is a first user equipment (UE), the target node is a second UE, and a source node is a base station.

19. The apparatus of claim 11, wherein the instructions are further executable by the processor to cause the apparatus to:
receive sidelink control information that includes the indication that the transport block is in the format of the first air interface.

20. The apparatus of claim 11, wherein the message includes a sidelink data message.

21. An apparatus for wireless communications at a source node, comprising:
a processor;
memory coupled with the processor; and
instructions stored in the memory and executable by the processor to cause the apparatus to:
transmit, to a relay node, control signaling configuring the relay node to receive a transport block via a first air interface and to forward the transport block to a target node via a second air interface that is different than the first air interface, each of the first air interface and the second air interface supporting a same size transport block; and
transmit, to the relay node via the first air interface, a first message comprising the transport block in a format of the first air interface based at least in part on the control signaling.

22. The apparatus of claim 21, wherein the first air interface is a radio air interface between the relay node and a radio access network of the source node, and the second air interface is a sidelink air interface.

23. The apparatus of claim 21, wherein the relay node is a first user equipment (UE), the target node is a second UE, and the source node is a base station.

24. A method for wireless communications at a relay node, comprising:
receiving, from a source node, control signaling configuring the relay node to receive a transport block via a first air interface and to forward the transport block to a target node via a second air interface that is different than the first air interface, each of the first air interface and the second air interface supporting a same size transport block;
receiving, from the source node via the first air interface, a first message comprising the transport block in a format of the first air interface based at least in part on the control signaling; and
transmitting, via the second air interface to the target node, a second message comprising the transport block and an indication that the transport block is in the format of the first air interface.

25. The method of claim 24, wherein transmitting the second message comprises:
transmitting the second message comprising sidelink control information that includes the indication that the transport block is in the format of the first air interface.

26. The method of claim 24, wherein transmitting the second message comprises:
transmitting the second message comprising the indication that a medium access control packet included in the second message is in the format of the first air interface.

27. The method of claim 24, wherein receiving the first message comprises:
decoding the first message according to the format of the first air interface to obtain a packet data unit comprising the transport block; and
encoding the packet data unit to generate the second message based at least in part on a second format of the second air interface.

28. The method of claim 27, further comprising:
forwarding the packet data unit from a first medium access control layer of a first protocol stack of the first air interface to a second medium access control layer of a second protocol stack of the second air interface for encoding to generate the second message.

29. The method of claim 24, wherein the first air interface is a radio air interface between the relay node and a radio access network of the source node, and the second air interface is a sidelink air interface.

30. The method of claim 24, wherein the relay node is a first user equipment (UE), the target node is a second UE, and the source node is a base station.

* * * * *